(12) United States Patent
Kubo et al.

(10) Patent No.: US 7,062,768 B2
(45) Date of Patent: Jun. 13, 2006

(54) DYNAMIC LOAD-DISTRIBUTED COMPUTER SYSTEM USING ESTIMATED EXPANSION RATIOS AND LOAD-DISTRIBUTING METHOD THEREFOR

(75) Inventors: Hidehito Kubo, Tokyo (JP); Yosuke Takano, Tokyo (JP)

(73) Assignee: NEC Corporation, Tokyo (JP)

(*) Notice: Subject to any disclaimer, the term of this patent is extended or adjusted under 35 U.S.C. 154(b) by 770 days.

(21) Appl. No.: 10/101,882

(22) Filed: Mar. 21, 2002

(65) Prior Publication Data

US 2002/0165900 A1 Nov. 7, 2002

(30) Foreign Application Priority Data

Mar. 21, 2001 (JP) ............................. 2001-080379

(51) Int. Cl.
*G06F 9/46* (2006.01)
(52) U.S. Cl. ...................................... 718/105; 709/223
(58) Field of Classification Search ........ 718/100–108; 709/226, 223
See application file for complete search history.

(56) References Cited

U.S. PATENT DOCUMENTS

| 4,495,570 A | * | 1/1985 | Kitajima et al. ............ 718/105 |
| 4,914,570 A | * | 4/1990 | Peacock ...................... 718/106 |
| 5,517,643 A | * | 5/1996 | Davy .......................... 718/105 |
| 5,774,668 A | * | 6/1998 | Choquier et al. ........... 709/223 |
| 5,845,116 A | * | 12/1998 | Saito et al. ................. 718/103 |
| 5,872,972 A | * | 2/1999 | Boland et al. .............. 718/102 |
| 5,951,634 A | * | 9/1999 | Sitbon et al. ............... 718/105 |
| 6,175,869 B1 | * | 1/2001 | Ahuja et al. ................ 709/226 |
| 6,385,636 B1 | * | 5/2002 | Suzuki ....................... 718/105 |
| 6,601,084 B1 | * | 7/2003 | Bhaskaran et al. ......... 718/105 |
| 6,748,413 B1 | * | 6/2004 | Bournas ..................... 718/105 |
| 6,986,139 B1 | * | 1/2006 | Kubo ......................... 718/105 |

FOREIGN PATENT DOCUMENTS

| JP | H06-243112 A | 9/1994 |
| JP | 7-302242 A | 11/1995 |
| JP | 10-027168 A | 1/1998 |
| JP | H10-187469 A | 7/1998 |
| JP | H10-240697 A | 9/1998 |
| JP | 10-312365 A | 11/1998 |
| JP | H11-110360 A | 4/1999 |
| JP | 2001-034591 A | 2/2001 |
| JP | 2001-034951 A | 2/2001 |
| JP | 2001-109638 A | 4/2001 |

OTHER PUBLICATIONS

Ferrari, Domenico et al. ("A Load Index For Dynamic Load Balancing", IEEE, published Jul. 1986, pp. 684-690).*

(Continued)

*Primary Examiner*—Meng-Ali T. An
*Assistant Examiner*—Jennifer N. To
(74) *Attorney, Agent, or Firm*—Sughrue Mion, PLLC

(57) ABSTRACT

In a method for distributing a transaction in a computer system including a plurality of computers each formed by processors, a plurality of estimated loads are calculated for the computers. Then, a plurality of estimated process time expansion ratios are calculated for the computers, in accordance with the estimated loads and the numbers of processors in the computers. Then, a plurality of load indexes one for each of the computers are calculated in accordance with the estimated process time expansion ratios. Finally, the transaction is distributed in accordance with the load indexes.

48 Claims, 17 Drawing Sheets

OTHER PUBLICATIONS

Yamai, Nariyoshi et al. ("Design And Implementation Of Command Unit Load Distribution Function In UNIX", Japan, Institute of Electronics, Information and Communication Engineers, publised Jul. 25th, 1994, J77-D-I, No. 7, pp. 483-492).*

Symons et al., "Development Of A Method Of Optimising Data Distribution On A Loosely Multiprocessor System", IEEE, vol. 143, No. 4, 1996, pp. 239-245.*

Rajagopalan et al., "An Agent Based Dynamic Load Balancing System", IEEE, 2000, pp. 164-171.*

Lavi et al., "The Home Model And Competitive Algorithms For Load Balancing In A Computing Cluster", IEEE, 2001, pp. 127-134.*

H. Kameda et al., "Optimal Load Balancing in Distributed Computer Systems", Springer-Verlag, (1997), pp. 230-232.

Lin, H.-C., et al., A Dynamic Load-Balancing Policy With a Central Job Dispatcher (LB), Software Engineering, IEEE Transaction on, IEEE, Feb. 1992, vol. 18, No. 2, pp. 148-158.

Yamai, Nariyoshi, and 3 others: Design and Implementation of command-unit load distribution function in UNIX. Denshi Joho Tsushin Gakkai Rombunshi, Japan, Institute of Electronics, Information and Communication Engineers, Jul. 25, 1994, J77-D-l, No. 7, pp. 483-492.

Tsuruta, Susumu and 1 other: Dynamic distributed processing systems using load prediction, and evaluation thereof. Denshi Joho Tsushin Gakkai Kenkyu Hokoku, Japan, Institute of Electronics, Information and Communication Engineers, Jun. 14, 1996, vol. 96, No. 95, pp. 25-32.

Kubo, Hideshi: Dynamic load distribution schemes based on estimated extension rate. Denshi Joho Tsushin Gakkai Rombunshi, Japan, Institute of Electronics, Information and Communication Engineers, Jun. 15, 2001, vol. 42, No. 6, pp. 1447-1459.

* cited by examiner

Fig. 5

| COMPUTER | NUMBER OF CPUs | NUMBER OF TRANSACTIONS (1) | NUMBER OF TRANSACTIONS (2) | NUMBER OF ESTIMATED TRANSACTIONS (1) | NUMBER OF ESTIMATED TRANSACTIONS (2) | ESTIMATED EXPANSION RATIO |
|---|---|---|---|---|---|---|
| 1 | m1 | Np1 | Pp1 | Ne1 | Pe1 | Ep1 |
| 2 | m2 | ... | ... | ... | ... | ... |
| ... | ... | ... | ... | ... | ... | ... |
| i | mi | Npi | Ppi | Nei | Pei | Epi |
| ... | ... | ... | ... | ... | ... | ... |
| n | mn | Npn | Ppn | Nen | Pen | Epn |

Fig. 6

| LOAD INDEX | BEFORE SCHEDULING | AFTER SCHEDULING | |
|---|---|---|---|
| | | UNKNOWN | KNOWN |
| ESTIMATED EXPANSION RATIO PER COMPUTER | Lp1=Epi | La1=Eni | Lk1=Eki |
| ESTIMATED EXPANSION RATIO PER CPU | Lp2=Nni·Eni/mi | La2=Nni·Eni/mi | Lk2=Nni·Eki/mi |
| INCREASED ESTIMATED EXPANSION RATIO PER CPU | —— | La3=mi(La2−Lp2) | Lk3=mi(Lk2−Lp2) |

FROM STEPS 408 & 409

$L_{p2i} \leftarrow N_{ri} \cdot E_{pi} / mi$

TO STEP 410

DYNAMIC LOAD-DISTRIBUTED COMPUTER SYSTEM USING ESTIMATED EXPANSION RATIOS AND LOAD-DISTRIBUTING METHOD THEREFOR

BACKGROUND OF THE INVENTION

1. Field of the Invention

The present invention relates to a dynamic load-distributed computer system including tightly-coupled computers which is called a cluster structure.

2. Description of the Related Art

In a load-distributed computer system including tightly-coupled computers, each computer formed by a plurality of symmetrical type multi-processors (SMPS), i.e., central processing units (CPUs), when a large number of messages requesting transaction processes arrive at the computer system, the messages are optimally distributed to the computers to enhance the performance of the computer system. Generally, since each transaction process is a small job, after one of the computers is selected to process this transaction process, the transaction process is completely carried out by the selected computer. Also, since transaction processes are generally interactively processed, the target of the load distribution is to minimize the average and deviation values of response time. When selecting one of the computers, one computer having the minimum load is selected in accordance with a load index such as the CPU utilization rate, the number of executed transactions and the past response time individually or in combination.

In a first prior art load-distributed computer system (see; JP-A-10-312365), a load such as a CPU utilization rate for each of the computers is measured and stored at predetermined time periods. Then, when a message requesting a transaction process arrives from a terminal unit, one of the computers having the minimum load is selected, so that this message is allocated to the selected computer. On the other hand, the terminal unit always determines whether or not a response time is larger than a threshold value. Only when the response time is larger than the threshold value, does the terminal unit request the computer system to change the selection of the computers.

In the above-described first prior art load-distributed computer system, however, since the CPU utilization rate as the first load index is calculated by the past average value which does not reflect the accurate current load, the reliability is not high. Particularly, under a dynamic control, when the same load index data is used until the next measuring timing, messages are concentrated on one of the computers whose load has been believed to be the minimum value, which would cause a seesaw phenomenon in the load. Also, the CPU utilization rate is not appropriate in a computer system including SMP computers. On the other hand, the response time as the second load index is used for switching the selected computer, which would be useful if the overhead is decreased. However, when a message requesting a transaction process arrives, the response time thereof is not obtained at this time, so that the response time is not an appropriate load index.

The first prior art load-distributed computer system using the CPU utilization rate as a load index is also disclosed in JP-A-2001-34591. In JP-A-2001-34591, the distribution of transactions are basically concentratedly controlled by using a round-robin discipline. In this case, when a selected computer is overloaded, another computer is selected. Also, when all the computers are overloaded, one of the computers having the minimum load is selected. Whether or not one computer is overloaded is determined by whether or not the load of the computer such as the CPU utilization rate thereof is higher than an upper limit. In this case, the overload amount is represented by the number of transactions over the upper limit of the CPU utilization rate. For example, if the CPU utilization rate is 90%, the upper limit is 60% and the number of executing-transactions is 10, the overload amount is $$10 \cdot (0.9/0.6-1)=5$$

That is, the determination of overload is basically carried out by the CPU utilization rate. However, as explained above, the reliability for a dynamic control is not high, and this determination is not appropriate in a SMP computer. Additionally, the number of transactions is assumed to be linear with the CPU utilization rate, which contradicts with a queue theory in which the number of clients has no relationship to the utilization rate particularly with a high load. Therefore, when all the computers are overloaded, the load distribution may be not appropriate. Further, this technology is not intended to decrease the minimum response time for arrival transactions and for the entire system.

In a second prior art load-distributed computer system (see JP-A-10-27168), each computer stores a response time of the latest transaction and multiplies this response time by the number of executed transactions therein, to obtain a load index. That is, when a message requesting a transaction process arrives, the load indexes of all the computers are calculated, and this message is sent to one of the computers having the minimum load index.

In the above-described second prior art load-distributed computer system, however, it is questionable whether the load index obtained based upon the response time of the latest transaction represents a typical response time of the computer. This response time reflects the congestion of the computer and the job characteristics such as a pure process time and a CPU time/input and output time ratio of the latest transaction. If the job characteristics are the same for all messages, the above-mentioned load index is appropriate. However, since there are actually different job characteristics in transaction, the above-mentioned load index is not appropriate. Also, no consideration is given to nonhomogeneous SMP computers In a third prior art load-distributed computer system (see: JP-A-7-302242), a load is periodically detected and a load tendency $T_r$ is calculated by $$T_r=(W2-W1)/(T2-T1)$$

where W1 is a load detected at time T1; and

W2 is a load detected at time T2. When a message requesting a transaction process is accepted, after a definite time period Ti had passed, it is determined whether or not $T_r \cdot T_i \leq Wt$ where Wt is a predicted load is satisfied. If $T_r \cdot T_i \leq Wt$, the subject computer carries out this transaction process. Otherwise, the requesting message is sent to another computer which has a lower load.

In the above-described third prior art load-distributed computer system, however, it is unclear what the predicted load is defined by. Also, the predicted load Wt, which is calculated by the linear extrapolation method, is not a good predicted value. On the other hand, a predicted load is actually determined microscopically, not macroscopically. That is, a predicted load is dependent upon the current state of the computer, an end timing of an executing-transaction, a timing for receiving a new transaction and the like. Therefore, since the predicted load of the third prior art load-distributed computer system is dependent upon the past load, the predicted load is not appropriate.

The above-described first, second and third prior art load-distributed computer systems are intended to minimize the response time of a message requesting a transaction process which has just arrived, not to minimize the response time of the entire system.

In a fourth prior art load-distributed computer system (see: Hisao Kameda et al., "Optimal Load Balancing in Distributed Computer Systems", Springer-Verlag, pp. 230–232, 1997), if the number of CPUs in each computer sharing a disk appartus is 1, a response time is defined by the utilization time of the CPU and the input/output time of the file apparatus. When a plurality of transactions are carried out, a queue of transactions may be generated before each computer. In the fourth prior art load-distributed computer system, the following two load indexes are defined:

$$f_i = s_i \cdot (n_i + 1)^2$$

$$F_i = s_i \cdot (n_i + 1)$$

where i is a computer number,
s is an average service time of the CPU of a transaction;
n is the number of transactions in the CPU. The load indexes are introduced by using an equilibrium state of an open-type queue network model where the number of CPUs is 1, to minimize the average response time. Actually, the formula $F_i = s_i \cdot (n_i + 1)$ represents an averge time of a transaction in the CPU, and therefore, an average response time is represented by this averge time plus an average time of the input/output time. The two load indexes have been proved to be optimum in view of a static load distribution.

In the above-described fourth prior art load-distributed computer system, however, since a dynamic control requires control at every moment, $s_i$ and $n_i$ should use current values, not average values. Note that it is possible to measure a current value of $n_i$, but it is impossible to directly measure a current value of $s_i$, since $s_i$ reflects the characteristics of a job mix executed in the computer i. Thus, $s_i$ is used as an equilibrium average value. An equilibrium average value may be used if the job characteristics are the same and have a small deviation. However, since there are actually different job characteristics, a dynamic control using the equilibrium average value may deteriorate. Additionally, the above-mentioned load indexes fi and Fi are applied to computers each having one CPU, but are not applied to SMP computers.

SUMMARY OF THE INVENTION

It is an object of the present invention to provide a dynamic load-distributed computer system having a plurality of closely-coupled computers each having a plurality of processors (CPUs), capable of improving the response characteristics such as the average and deviation characteristics of the response time.

Another object is to provide a load-distributing method for the above-mentioned dynamic load-distributed computer system.

According to the present invention, in a method for distributing a transaction in a computer system including a plurality of computers each formed by processors, a plurality of estimated loads are calculated for the computers. Then, a plurality of estimated process time expansion ratios are calculated for the computers, in accordance with the estimated loads and the numbers of processors in the computers. Then, a plurality of load indexes one for each of the computers are calculated in accordance with the estimated process time expansion ratios. Finally, the transaction is distributed in accordance with the load indexes.

Also, in a load-distributed computer system including a plurality of computers each including processors, a relay distributing unit for receiving a message requesting a transaction process, and a channel communication network connected between the computers and the relay distributing unit, each of the computers is constructed by a first load data measuring unit for measuring a load of each of the computers, and a transaction processing unit for processing transactions. Also, the relay distributing unit is constructed by a second load data measuring unit for receiving the load to calculate an estimated load in accordance with the load, a load data storing unit for storing the estimated load data, and an executing computer selecting unit for calculating a plurality of estimated process time expansion ratios one for each of the computers, in accordance with the stored estimated loads and the number of processors in each of the computers, calculating a plurality of load indexes, one for each of the computers, in accordance with the estimated process time expansion ratios, selecting one of the computers having the minimum load index in accordance with the load indexes, and causing the transaction to be processed by the transaction processing unit of the selected computer.

Further, in a load-distributed computer system including a plurality of computers each including processors, each for receiving a message requesting a transaction process, and an exchange/store unit connected to the computers, each of the computers is constructed by a first load data measuring unit for measuring a load of each of the computers, a transaction processing unit for processing transactions, a second load data measuring unit for receiving the load to calculate an estimated load in accordance with the load, a load data storing unit for storing the estimated load data, an executing-computer selecting unit for calculating a plurality of estimated process time expansion ratios one for each of the computers, in accordance with the stored estimated loads and the number of processors in each of the computers, calculating a plurality of load indexes, one for each of the computers, in accordance with the estimated process time expansion ratios, determining whether or not each of the computers is to process the transaction process in accordance with the load indexes, causing the transaction process to be processed by the transaction processing unit when the each of the computers is to process the transaction process, and transmitting the message via the exchange/store unit to another computer when each of the computers is not to process the transaction process.

BRIEF DESCRIPTION OF THE DRAWINGS

The present invention will be more clearly understood from the description set forth below, with reference to the accompanying drawings, wherein:

FIG. 5 is a table of the load data storing unit of FIG. 1;

FIG. 6 is a table of load indexes used in the first embodiment of the present invention;

DESCRIPTION OF THE PREFERRED EMBODIMENTS

A first embodiment of the load-distributed computer system according to the present invention will now be explained with reference to FIGS. 1, 2, 3A, 3B, 4, 5, 6, 7, 8A, 8B, 8C, 9A, 9B and 9C.

Figure 1:
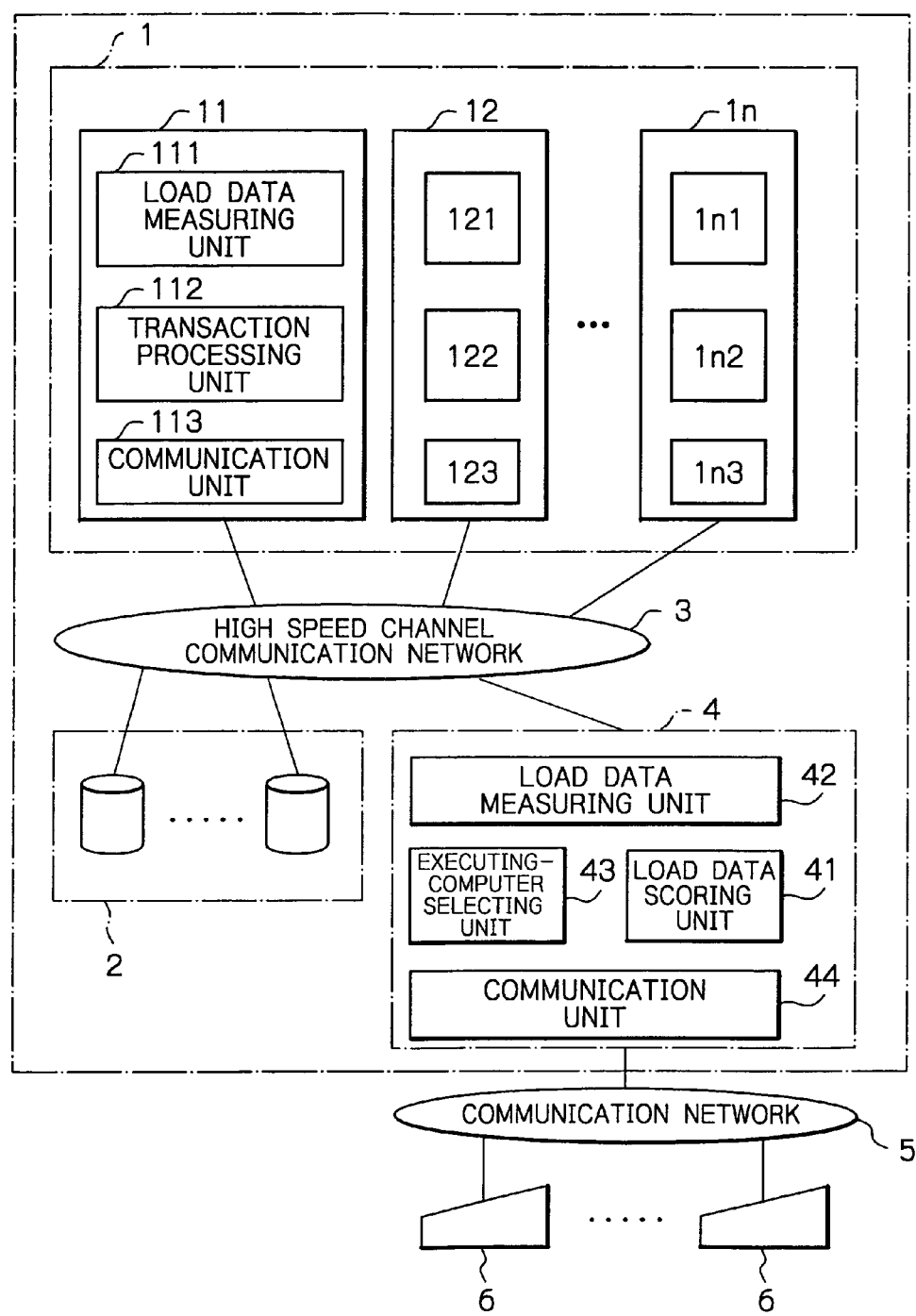
FIG. 1 is a block circuit diagram illustrating a first embodiment of the load-distributed computer system according to the present invention.

In FIG. 1, which illustrates a first embodiment of the load-distributed computer system according to the present invention, reference numeral 1 designates a computer apparatus formed by a plurality of computers 11, 12, . . . , 1*n* each including a load data measuring unit 1*i*1, a transaction processing unit 1*i*2 and a communication unit 1*i*3. The computer apparatus 1 is connected to a file apparatus 2 formed by a plurality of disk units through a single high speed channel communication network 3.

Also, a relay distributing apparatus 4 is connected via the high speed channel communication network 3 to the computer apparatus 1. The relay distributing apparatus 4 is formed by a load data storing unit 41, a load data measuring unit 42, an executing-computer selecting unit 43 and a communication unit 44.

The load-distributed computer system of FIG. 1 is connected via a communication network 5 to a large number of external terminal units 6.

Figure 2:
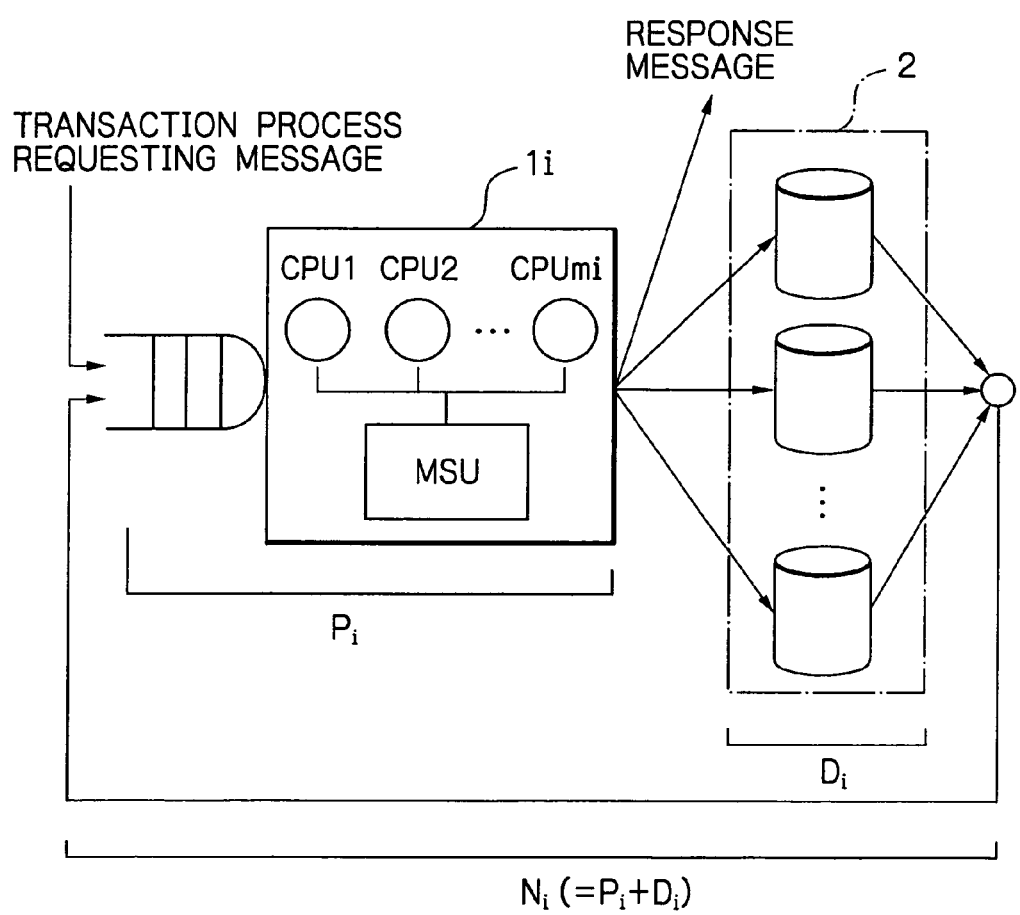
FIG. 2 is a circuit diagram of one computer of the computer apparatus of FIG. 1.

In FIG. 2, which illustrates one computer 1*i* of the computer apparatus 1 of FIG. 1, the computer 1*i* is a symmetrical type multi-processor (SMP) which includes a plurality of central processing units CPU1, CPU2, . . . , CPUmi which share a main storage unit MSU and the disk units of the file apparatus 2. That is, the computers 11, 12, . . . , 1*n* do not share one main storage unit. Generally, the resource utilization characteristics of one transaction is dependent upon the utilization of the CPUs and the number of input/output operations of the main storage unit MSU and the file apparatus 2. Therefore, when a plurality of transactions are carried out in the computer 1*i*, a conflict may occur in the resources, i.e., the main storage unit MSU and the file apparatus 2, so that transactions are queued at the computer 1*i*. In this case, the higher the resource utilization characteristics of the computer 1*i*, the longer the queue of transactions. As illustrated in FIG. 2, only one series of transactions are queued at the computer 1*i*, and its operating system assigns the queue of transactions to the CPUs homogeneously. In this case, the input/output operation characteristics of the CPUs for the file apparatus 2 are homogeneous in view of the performance, so that the processing time of the file apparatus 2 can be assumed to be equal for the computer 1*i*.

In FIG. 2, $N_i$ designates the number of transactions in total which are currently assigned to the computer 1*i*. That is, the transaction number $N_i$ includes the number of transactions queued at the computer 1*i*, the number of transactions which are currently being executed in the computer 1*i* and the number of transactions stored in the file apparatus 2 executed by the computer 1*i*. Also, $P_i$ designates the number of transactions which are currently executed in the computer 1*i*. That is, the transaction number $P_i$ includes the number of transactions queued at the computer 1*i* and transactions which are currently being executed in the computer 1*i*. Further, $D_i$ designates the number of transactions stored in the file apparatus 2 executed by the computer 1*i*. Therefore, generally, $N_i=P_i+D_i$.

In the computer system of FIGS. 1 and 2, in the computer 1*i*, at every predetermined time period, the load data measuring unit 1*i*1 measures a load data and transmits it via the communication unit 1*i*3 to the relay distributing apparatus 4. On the other hand, in the relay distributing apparatus 4, the load data measuring unit 42 receives the load data from the computer 1*i*, and then, changes the load data into an estimated load data and stores it in the load data storing unit 41.

Also, in the computer system of FIGS. 1 and 2, one transaction (job) is processed as follows. First, a message requesting a transaction process is transmitted from one of the terminal units 6 via the communication network 5 to the relay distributing apparatus 4. Then, the executing-computer selecting unit 43 calculates estimated expansion ratios of the computers 11, 12, . . . , 1*n* from the estimated load data and determines in which computer the transaction process is to be executed in accordance with the estimated expansion ratios. Then, the executing-computer selecting unit 43 sends the above-mentioned message to the determined computer such as 1*i*. Then, after the computer 1*i* carries out this transaction process, the computer 1*i* transmits a response message to the relay distributing apparatus 4, so that this response message is transmitted via the communication network 5 to the one of the terminal units 6.

The load data measuring unit 1*i*1, the transaction processing unit 1*i*2 and the communication unit 1*i*3 of the computer 1*i* are usually realized by using software (programs). In this case, when the computer 1*i* is started up, such software is loaded thereinto. Similarly, the load data storing unit 41, the executing-computer selecting unit 42, the load measuring unit 42 and the communication unit 44 of the relay distributing apparatus 4 are usually realized by using software (programs). In this case, when the relay distributing apparatus 4 is started up, such software is loaded thereinto.

Figure 3A:
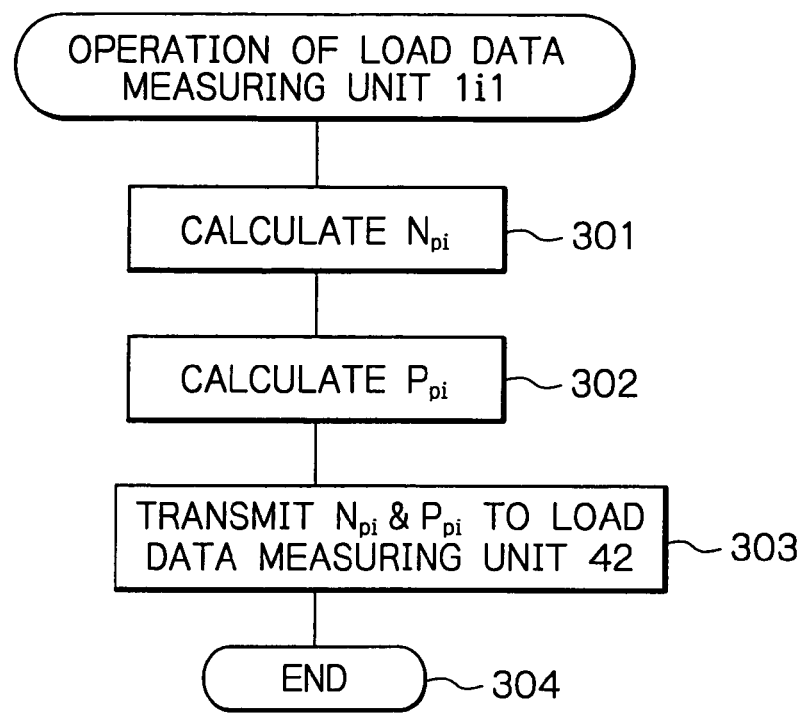
FIG. 3A is a flowchart for explaining the operation of the load data measuring unit of the computer of FIG. 1.
Figure 3B:
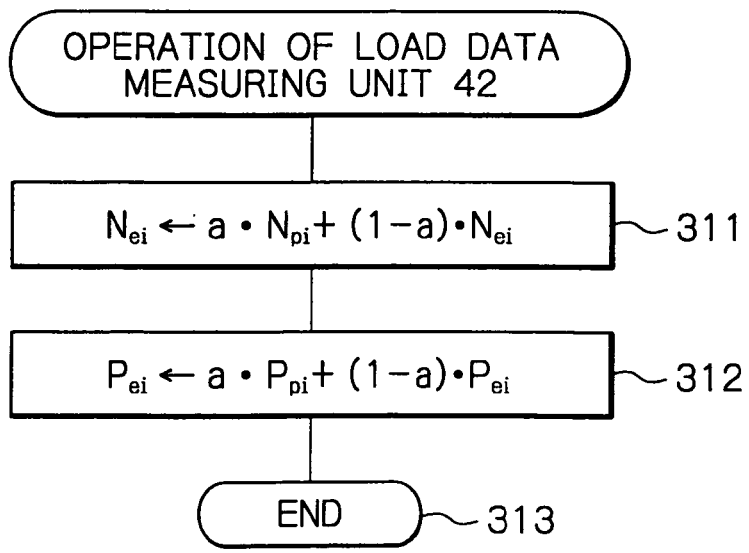
FIG. 3B is a flowchart for explaining the operation of the load data measuring unit if the relay distributing of FIG. 1, FIG. 4, is a flowchart for explaining the operation of the executing-computer selecting unit of FIG. 1.

The operations of the load data measuring unit 1*i*1 and the load data measuring unit 42 are explained next with reference to flowcharts as illustrated in FIGS. 3A and 3B.

The flowchart as illustrated in FIG. 3A is carried out by the load data measuring unit 1i1 at every predetermined time period smaller than 100 msec. In this case, the smaller the predetermined time period, the higher the accuracy of load distribution. On the other hand, the smaller the predetermined time period, the smaller the overhead. The predetermined time period is preferably about 10 msec.

First, at step 301, the load data measuring unit 1i1 calculates the number $N_{pi}$ of transactions in total currently-assigned to the computer 1i.

Next, at step 302, the load data measuring unit 1i1 calculates the number $P_{pi}$ of transactions which are currently being executed in the computer 1i.

Next, at step 303, the load data measuring unit 1i1 transmits the current load data $N_{pi}$ and $P_{pi}$ to the load measuring unit 42 of the relay distributing unit 4.

Thus, the operation of the flowchart of FIG. 3A is completed by step 304.

The flowchart of FIG. 3B is carried out by the load data measuring unit 42 every time the load data measuring unit 42 receives the current load data $N_{pi}$ and $P_{pi}$ from the load data measuring unit 1i1.

First, at step 311, the load data measuring unit 42 calculates an estimated number $N_{ei}$ by $$N_{ei} \leftarrow a \cdot N_{pi} + (1-a) \cdot N_{ei}$$

where "a" is a definite value ($0 < a \leq 1$). Then, the estimated number $N_{ei}$ is stored in the load data storing unit 41 as shown in FIG. 5.

Next, at step 312, the load data measuring unit 42 calculates an estimated number $P_{ei}$ by $$P_{ei} \leftarrow a \cdot P_{pi} + (1-a) \cdot P_{ei}$$

Then, the estimated number $P_{ei}$ is stored in the load data storing unit 41 as shown in FIG. 5.

Thus, the flowchart of FIG. 3B is completed by step 313.

In FIG. 3B, the estimated load data $N_{ei}$ and $P_{ei}$ are reflected by the past values of $N_{pi}$ and $P_{pi}$. In this case, the smaller the value "a", the larger the ratio of the past values to the current values in the estimated load data $N_{ei}$ and $P_{ei}$. If the above-mentioned time period is small, the value "a" is 0.1, for example, to increase the reliability of the estimated load data $N_{ei}$ and $P_{ei}$.

Figure 4:
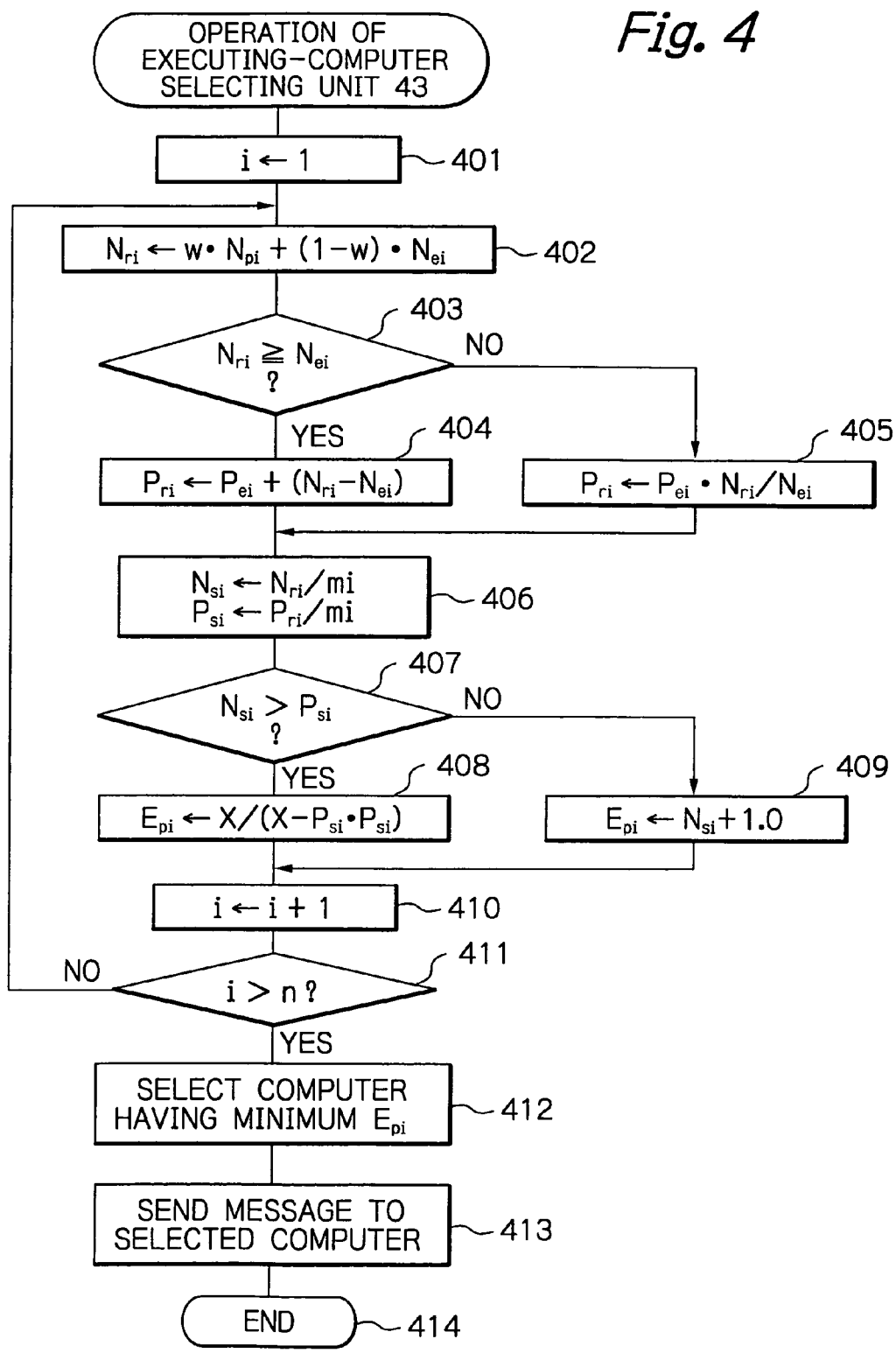

The operation of the executing-computer selecting unit 43 is explained next with reference to a flowchart as illustrated in FIG. 4, which is carried out every time one of the terminal units 6 transmits a message requesting a transaction process via the communication network 5 and the communication unit 44 to the executing-computer selecting unit 43.

First, at step 401, a value i is initialized, i.e., $$i \leftarrow 1$$

Next, at step 402, the executing-computer selecting unit 43 calculates a corrected number $N_{ri}$ of the estimated number $N_{ei}$ by $$N_{ri} \leftarrow w \cdot N_{pi} + (1-w) \cdot N_{ei}.$$

where w is a definite value ($0 < w \leq 1$). In this case, the value w is preferably about 0.8. That is, the estimated numbers $N_{ei}$ and $P_{ei}$ are obtained at a predetermined timing, while the corrected number $N_{ri}$ is obtained as an optimal value at this timing in accordance with the estimated numbers $N_{ei}$ and $P_{ei}$.

Next, at step 403, it is determined whether $N_{ri} \geq N_{ei}$ is satisfied. As a result, if $N_{ri} \geq N_{ei}$, the control proceeds to step 404 which calculates a corrected number $P_{ri}$ by $$P_{ri} \leftarrow P_{ei} + (N_{ri} - N_{ei})$$

That is, the corrected number $P_{ri}$ is increased by ($N_{ri} - N_{ei}$).

On the other hand, at step 403, if $N_{ri} \geq N_{ei}$, the control proceeds to step 405 which calculates a corrected number $P_{ri}$ by $$P_{ri} \leftarrow P_{ei} \cdot N_{ri} / N_{ei}$$

That is, the corrected number $P_{ri}$ is decreased by the ratio $N_{ri}/N_{ei}$.

Next, at step 406, a corrected number $N_{si}$ per one CPU is calculated by $$N_{si} \leftarrow N_{ri} / mi$$

Also, a corrected number $P_{si}$ per one CPU is calculated by $$P_{si} \leftarrow P_{ri} / mi$$

Next, at step 407, it is determined whether or not $N_{si} > P_{si}$ is satisfied. As a result, if $N_{si} > P_{si}$, the control proceeds to step 408 which calculates an estimated expansion ratio $E_{pi}$ by $$E_{pi} \leftarrow X / (X - P_{si} \cdot P_{si})$$

where X is $N_{si} \cdot (P_{si} + 1)$.

The above-mentioned estimated expansion ratio $E_{pi}$ can be proved as follows (see formulae (8.1) and (8.3) of page 228 of Hisao Kameda et al., "Optimal Load Balancing in Distributed Computer", Springer-Verlag, 1997). Here, the transmission time of transactions not including waiting time for the file appartus 2 is assumed to be exponentially distributed, i.e., have a Poison distribution. The following parameters are defined:

P: the average number of transactions in one computer;
D: the average number of transactions in the file apparatus for that computer;
N: the average total number of transactions for that computer;
T: estimated process time per one transaction;
t: pure process time per one transaction;
s: CPU utilization time per one transaction; and
d: input/output time per one transaction.

In this case, $$N = P + D \quad (1)$$

$$t = s + d \quad (2)$$

Also, a CPU utilization ratio R is defined by $$P + 1 = 1/(1-R)$$

$$\therefore R = P/(P+1) \quad (3)$$

Further, due to no waiting time for the file apparatus 2, $$d/s = D/R \quad (4)$$

From the formulae (1), (2), (3) and (4), $$s = Pt/(P + D + PD) \quad (5)$$
$$= Pt/(N(P+1) - P \cdot P)$$

On the other hand, the estimated process time T is given by $$T = s(P+1) - d \quad (6)$$
$$= sP + t$$

Therefore, $$T = P \cdot (Pt/N(P+1) - P \cdot P) + t \quad (7)$$
$$= N(P+1)t/(N(P+1) - P \cdot P))$$
$$= Xt/(X - P \cdot P)$$

where X=N(P+1).

Thus, an estimated expansion ratio E is $$E = T/t \quad (8)$$
$$= X/(X - P \cdot P)$$

In Formula (8), if N and P are replaced by $N_{si}$ and $P_{si}$, respectively, the above-mentioned estimated expansion ratio $E_{pi}$ can be obtained.

In the symmetrical-type multi-processor (SMP), the numbers $N_{si}$ and $P_{si}$ per one CPU are used. The estimated expansion ratio $E_{pi}$ using $N_{si}$ and $P_{si}$ are not accurate for the symmetrical-type multi-processor; however, the estimated expansion ratio $E_{pi}$ is actually useful in practice. Note that this is quite different from a case where 1/mi of the load of the same job mix is applied to one CPU.

Also, the above-mentioned estimated expansion ratio $E_{pi}$ is based upon an equilibrium state. In the equilibrium state, the estimated expansion ratio $E_{pi}$ can be obtained by the estimated numbers $N_{ei}$ and $P_{ei}$ in view of a static load distribution. In this embodiment, however, the estimated expansion ratio $E_{pi}$ is obtained by the corrected numbers $N_{ri}$ and $P_{ri}$ affected by the current number $N_{pi}$ in view of a dynamic load distribution.

Returning to FIG. 4, at step 407, if $N_{si} \leq P_{si}$, the control proceeds to step 409 which causes the estimated expansion ratio $E_{pi}$ to be $N_{si}$+1.0.

The operations at steps 402 through 409 are repeated for all the computers 1$i$ (i=1, 2, . . . , n) by steps 410 and 411.

Next, at step 412, the executing-computer selecting unit 43 selects one of the computers having the minimum estimated expansion ratio $E_{pi}$.

Next, at step 413, the executing-computer selecting unit 43 sends a message requesting a transaction process to the computer selected at step 412. As a result, the selected computer carries out a transaction process.

Thus, the flowchart of FIG. 4 is completed by step 414.

In the above-described embodiment, the estimated expansion ratio $E_{pi}(=L_{p1})$ is used as a load index. However, as shown in FIG. 6; an estimated expansion ration $N_{ri} \cdot E_{pi}$/mi per one CPU (=$L_{p2}$) can be used as a load index. Note that the load indexes $L_{p1}$ and $L_{p2}$ are both estimated expansion ratios before scheduling, i.e., before distributing a message requesting a transaction process.

Figure 7:
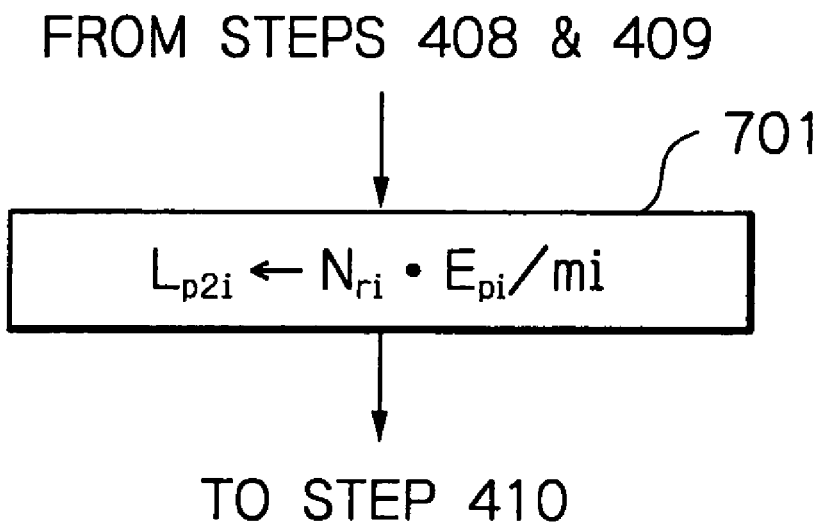
FIG. 7 is a flowchart illustrating a modification of FIG. 4 in which the load index $L_{p2}$ of FIG. 6 is used.

When the load index $L_{p2}$ of FIG. 6 is used, the flowchart of FIG. 4 is modified to a flowchart as illustrated in FIG. 7. That is, at step 701, an estimated expansion ratio $L_{p2i}$ per one CPU is calculated by $$L_{p2i} \leftarrow N_{ri} \cdot E_{pi}/\text{mi}$$

In this case, at step 412, the executing-computer selecting unit 43 selects one of the computers having the minimum estimated expansion ratio $N_{ri} \cdot E_{pi}$/mi.

Also, as shown in FIG. 6, an estimated expansion ratio $E_{ni}$ (=$L_{ai}$) per one transaction after scheduling, i.e., after distributing a message requesting a transaction process whose characteristics are unknown or not expected.

Figure 8A:
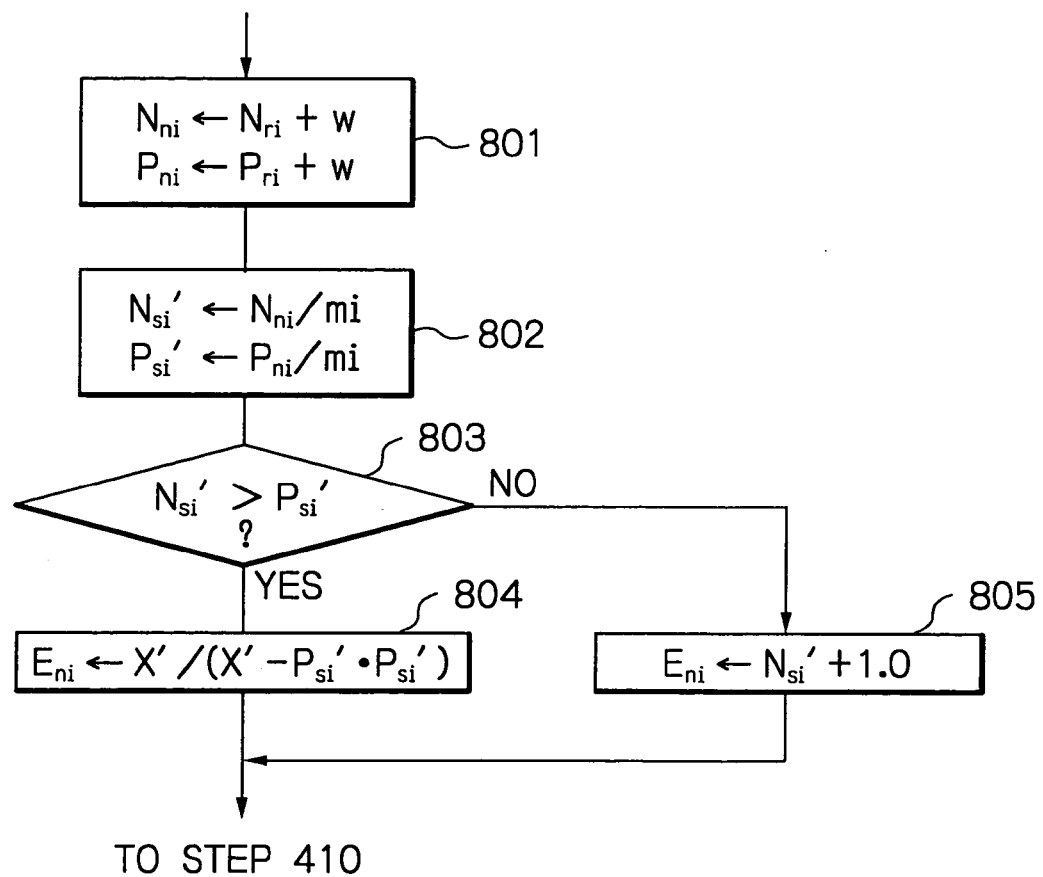
FIG. 8A is a flowchart illustrating a modification of FIG. 4 in which the load index $L_{a1}$ of FIG. 6 is used.

When the load index $L_{ai}$ is used, the flowchart of FIG. 4 is modified to a flowchart as illustrated in FIG. 8A. In this case, steps 406 to 409 of FIG. 4 are replaced by steps 801 to 805.

At step 801, the number $N_{ni}$ of total transactions for the computer 1$i$ and the number $P_{ni}$ of transactions in the computer 1$i$ are increased by $$N_{ni} \leftarrow N_{ri} + w$$

$$P_{ni} \leftarrow P_{ri} + w$$

where w is the same value at step 402 of FIG. 4.

Next, at step 802, a corrected number $N_{si}'$ per one CPU is calculated by $$N_{si}' \leftarrow N_{ni}/\text{mi}$$

Also, a corrected number $P_{si}'$ per one CPU is calculated by $$P_{si}' \leftarrow P_{ni}/\text{mi}$$

Next, at step 803, it is determined whether or not $N_{si}'>P_{si}'$ is satisfied. As a result, if $N_{si}'>P_{si}'$, the control proceeds to step 408 which calculates an estimated expansion ratio $E_{ni}$ by $$E_{ni} \leftarrow X'/(X'-P_{si} \cdot P_{si})$$

where X' is $N_{si}' \cdot (P_{si}'+1)$.

On the other hand, at step 803, if $N_{si}' \leq P_{si}'$ the control proceeds to step 805 which causes the estimated expansion ratio $E_{ni}$ to be $N_{ni}'$+1.0.

In this case, at step 412, the executing-computer selecting unit 43 selects one of the computers having the minimum estimated expansion ratio $E_{ni}$.

Also, as shown in FIG. 6, an estimated expansion ration $N_{ni} \cdot E_{ni}$/mi per one CPU (=$L_{a2}$) can be used as a load index. Note that the load index $L_{a2}$ is an estimated expansion ratio after scheduling, i.e., after distributing a message requesting a transaction process whose characteristics are known or expected.

Figure 8B:
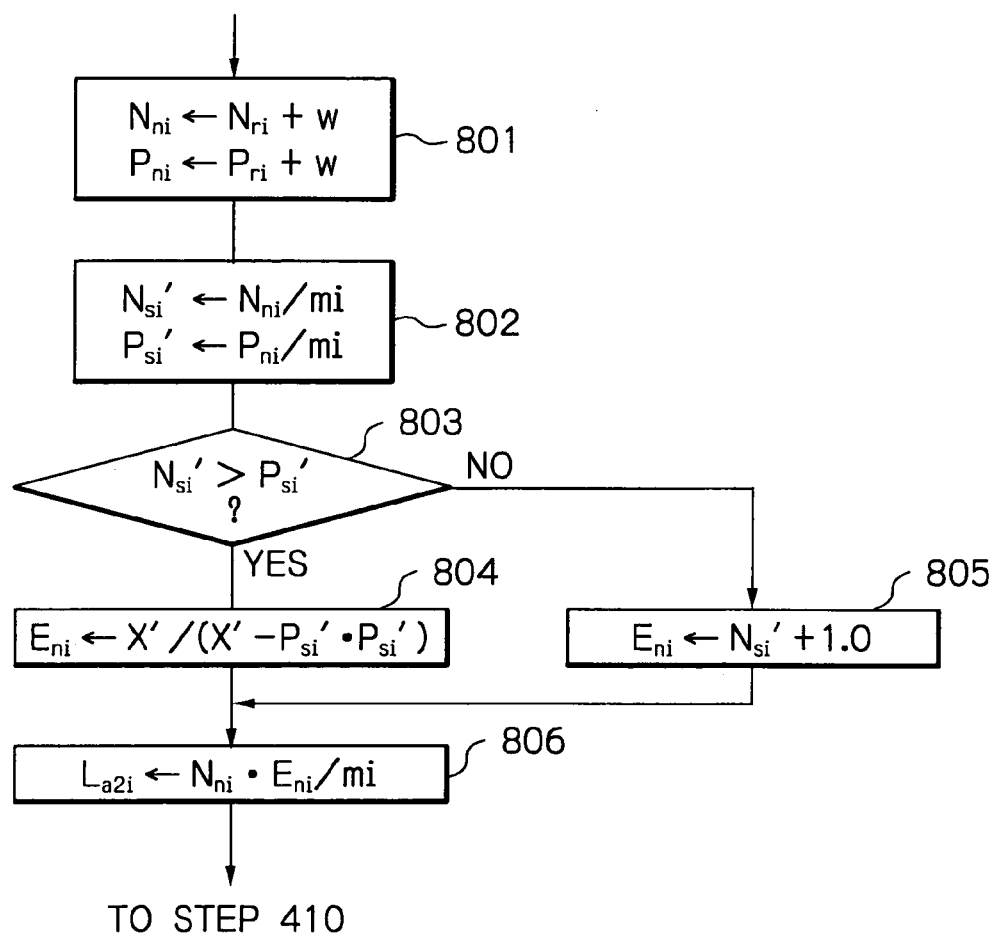
FIG. 8B is a flowchart illustrating a modification of FIG. 8A in which the load index $L_{a2}$ of FIG. 6 is used.

When the load index $L_{a2}$ of FIG. 6 is used, the flowchart of FIG. 8A is modified to a flowchart as illustrated in FIG. 8B. That is, step 806 is added to steps of FIG. 8A. At step 806, an estimated expansion ratio $L_{a2i}$ per one CPU is calculated by $$L_{a2i} \leftarrow N_{ni} \cdot E_{ni}/\text{mi}$$

In this case, at step 412, the executing-computer selecting unit 43 selects one of the computers having the minimum estimated expansion ratio $L_{a2i}$.

Also, as shown in FIG. 6, an increased estimated expansion ratio mi($L_{a2}-L_{p2}$) per one CPU (=$L_{a3}$) can be used as a load index. Note that the load indexes $L_{a3}$ is also an estimated expansion ratios after scheduling, i.e., after distributing a message requesting a transaction process whose characteristics are unknown or not expected.

Figure 8C:
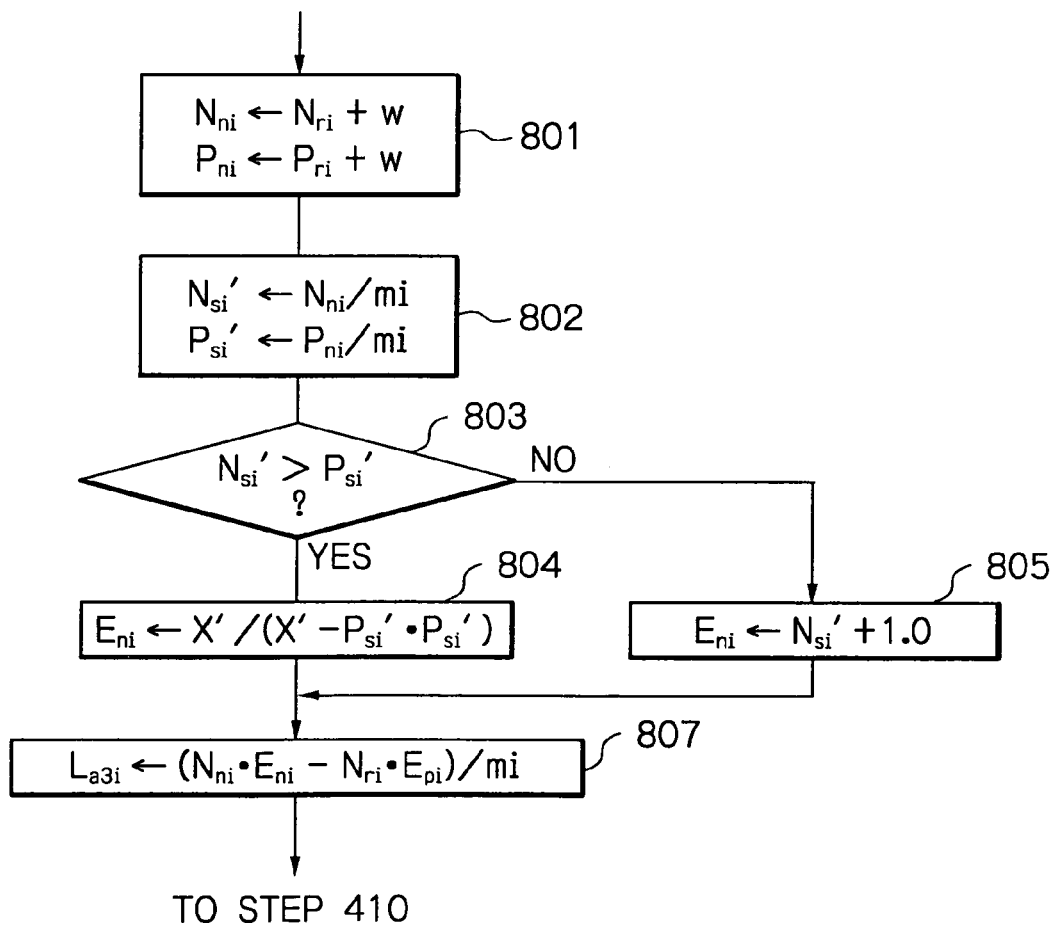
FIG. 8C is a flowchart illustrating a modification of FIG. 4 in which the load index $L_{a3}$ of FIG. 6 is used.

When the load index $L_{a3}$ of FIG. 6 is used, the flowchart of FIG. 4 is modified to a flowchart as illustrated in FIG. 8C. In this case, steps 801 to 805 and 807 are added to FIG. 4.

Steps 801 to 805 are carried out in the same way as in FIG. 8A.

Next, at step 807, an increased estimated expansion ratio $L_{a3i}$ per one CPU is calculated by $$L_{a3i} \leftarrow (N_{ni} \cdot E_{ni} - N_{ri} \cdot E_{pi})/\text{mi}$$

In this case, at step 412, the executing-computer selecting unit 43 selects one of the computers having the minimum increased estimated expansion ratio $L_{a3i}$.

Also, as shown in FIG. 6, an estimated expansion ratio $E_{ki}$ ($=L_{ki}$) per one transaction after scheduling, i.e., after distributing a message requesting a transaction process whose characteristics are known or expected.

Figure 9A:
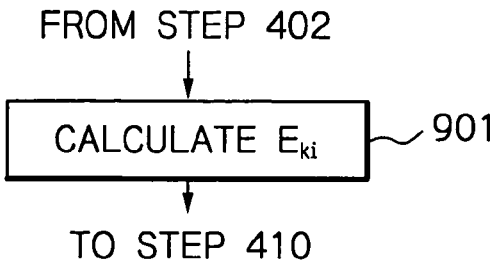
FIG. 9A is a flowchart illustrating a modification of FIG. 4 in which the load index $L_{k1}$ of FIG. 6 is used.

When the load index $L_{ki}$ is used, the flowchart of FIG. 4 is modified to a flowchart as illustrated in FIG. 9A. In this case, steps 406 to 409 of FIG. 4 are replaced by step 901.

At step 901, $N_{ni}$/mi and $P_{ni}$/mi are calculated. That is, a ratio C of a CPU utilization time s to a pure process time t for a transaction is estimated. If $C_1$ is a value of the ratio C in the computer 1$i$ before scheduling is represented by using formula (5), i.e., $$C_1 = P_{ri}/(N_{ri} \cdot (1+P_{ri}) - P_{ri} \cdot P_{ri}))$$

Also, $C_2$ is assumed to be a value of the ratio C in the computer 1$i$ after scheduling a message having a ratio $C_0$ in the computer 1$i$. In this case, there are $N_{ri}$ transactions having an average ratio of $C_1$, and one transaction having the ratio $C_0$ is added thereto. As a result, the number of transactions in the computer 1$i$ is represented by $N_{ni}$ whose average ratio C is $C_2$ is represented by $$C_2 = (N_{ri} \cdot C_1 + C_0)/N_{ni}$$

On the other hand, if formula (5):

$$s/t = P/(NP+N-P \cdot P)$$

is applied to an after-scheduling state, since $s/t = C_2$, $$C_2 = (A \cdot y + A - y^2) = y$$

where $A = N_{ni}/\text{mi} = (N_{ni} + w)/\text{mi}$ $y = P_{ni}/\text{mi}$.

That is, $$C_2 y^2 + (1 - C_2 \cdot A)y - C_2 \cdot A = 0$$

when this equation is solved, $P_{ni}/\text{mi}$ (=A) which is in this case positive is obtained.

Then, $N_{si}$ and $P_{si}$ are calculated by $$N_{si} \leftarrow N_{ni}/\text{mi}$$

$$P_{si} \leftarrow P_{ni}/\text{mi}$$

Then, similar steps as steps 407, 408 and 409 of FIG. 4 calculate an estimated expansion ratio $E_{ki}$.

In this case, at step 412, the executing-computer selecting unit 43 selects one of the computers having the minimum estimated expansion ratio $E_{ki}$.

Further, as shown in FIG. 6, an estimated expansion ration $N_{ni} \cdot E_{ni}/\text{mi}$ per one CPU ($=L_{k2}$) can be used as a load index. Note that the load index $L_{k2}$ is an estimated expansion ratio after scheduling, i.e., after distributing a message requesting a transaction process whose characteristics are unknown or not expected.

Figure 9B:
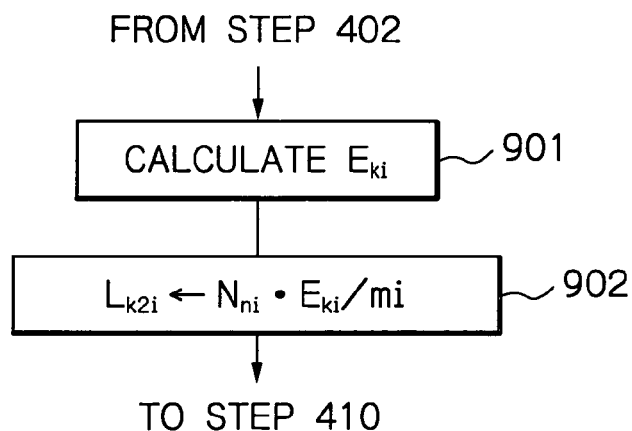
FIG. 9B is a flowchart illustrating a modification of FIG. 8A in which the load index $L_{k2}$ of FIG. 6 is used.

When the load index $L_{k2}$ of FIG. 6 is used, the flowchart of FIG. 9A is modified to a flowchart as illustrated in FIG. 9B. That is, step 902 is added to step of FIG. 9A. At step 901, an estimated expansion ratio $L_{k2i}$ per one CPU is calculated by $$L_{k2i} \leftarrow N_{ni} \cdot E_{ki}/\text{mi}$$

In this case, at step 412, the executing-computer selecting unit 43 selects one of the computers having the minimum estimated expansion ratio $L_{k2i}$.

Further, as shown in FIG. 6, an increased estimated expansion ratio mi($L_{k2} - L_{p2}$) per one CPU ($=L_{k3}$) can be used as a load index. Note that the load indexes $L_{k3}$ are also estimated expansion ratios after scheduling, i.e., after distributing a message requesting a transaction process whose characteristics are known or expected.

Figure 9C:
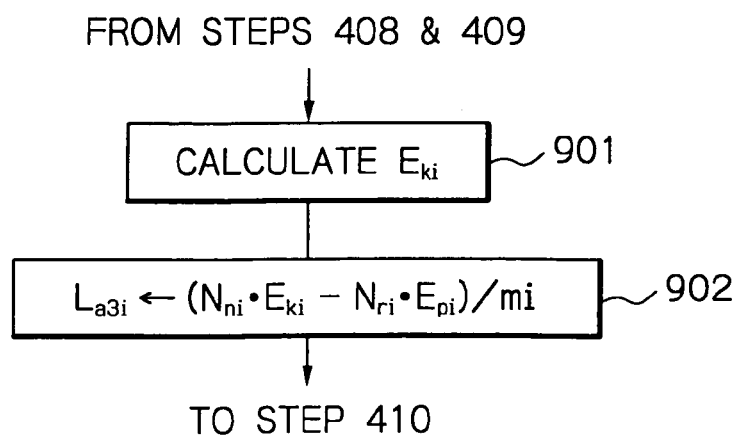
FIG. 9C is a flowchart illustrating a modification of FIG. 4 in which the load index $L_{k3}$ of FIG. 6 is used.

When the load index $L_{k3}$ of FIG. 6 is used, the flowchart of FIG. 4 is modified to a flowchart as illustrated in FIG. 9C. In this case, steps 901 and 903 are added to FIG. 4.

Step 901 is carried out in the same way as in FIG. 9A.

Next, at step 902, an increased estimated expansion ratio $L_{k3i}$ per one CPU is calculated by $$L_{k3i} \leftarrow (N_{ni} \cdot E_{ki} - N_{ri} \cdot E_{pi})/\text{mi}$$

In this case, at step 412, the executing-computer selecting unit 43 selects one of the computers having the minimum increased estimated expansion ratio $L_{k3i}$.

Note that an expansion ratio E designates a ratio of an actual process time including a waiting time to a pure process time of one transaction, and $E_i$ is an expansion ratio in the computer 1$i$. If the pure process time of a transaction is the same in all the computers 11, 12, . . . , 1$n$, when this transaction is allocated to one of the computers having the minimum expansion ratio, the process time of this transaction can be minimized. An estimated expansion ratio reflects program characteristics of transactions (job mix) currently being executed in the subject computer including the CPU characteristics and input/output characteristics thereof. Also, when the formula at step 408 is used, an estimated expansion ratio can be obtained by only observed data without knowing the individual characteristics of transactions currently being executed in the subject computer. The formula at step 408 basically belongs to the fourth prior art and is derived by modifying the formula $F_i = s_i(n_r+1)^2$; however, the estimated expansion ratio according to the first embodiment is reflected by the characteristics of the job mix as well as the total process time including the CPU process time and the input/output time thereof, thus improving the accuracy and dynamic characteristics of the computer system. Note that, since the formula at step 408 is based upon an equilibrium average state, a perfect reliability cannot be expected.

In the first embodiment, one of the eight load indexes $L_{p1}$, $L_{p2}$, $L_{a1}$, $L_{a2}$, $L_{a3}$, $L_{k1}$, $L_{k2}$ and $L_{k3}$ is used. In this case, all the eight load indexes can be calculated and stored in the load data storing unit 41, and as occasion demands, one of the eight load indexes can be selected. Note that, since the load indexes $L_{a3}$ and $L_{k3}$ are helpful in decreasing the increased process time by scheduling a transaction, it is expected to minimize the entire process time of the subject computer. In this case, if the characteristics of a given transaction are known or expected, the load index $L_{k3}$ should be selected. Otherwise, i.e., if the characteristics of a given transaction are unknown or not expected, the load index $L_{k3}$ should not be selected, and instead of this, the load index $L_{k2}$ should be selected.

Thus, in the first embodiment, the relay distributing unit 4 supervises the load states of all the computers 1$i$ in real time. Also, when the relay distributing unit 4 receives a message requesting a transaction process, the relay distributing unit 4 calculates an estimated expansion ratio of each of the computers and sends this message to one of the computers having the minimum expansion ratio. As a result, since a concentrated control by the relay distributing unit 4 can be realized, the overhead can be suppressed and an excellent load distribution can be realized.

Figure 10:
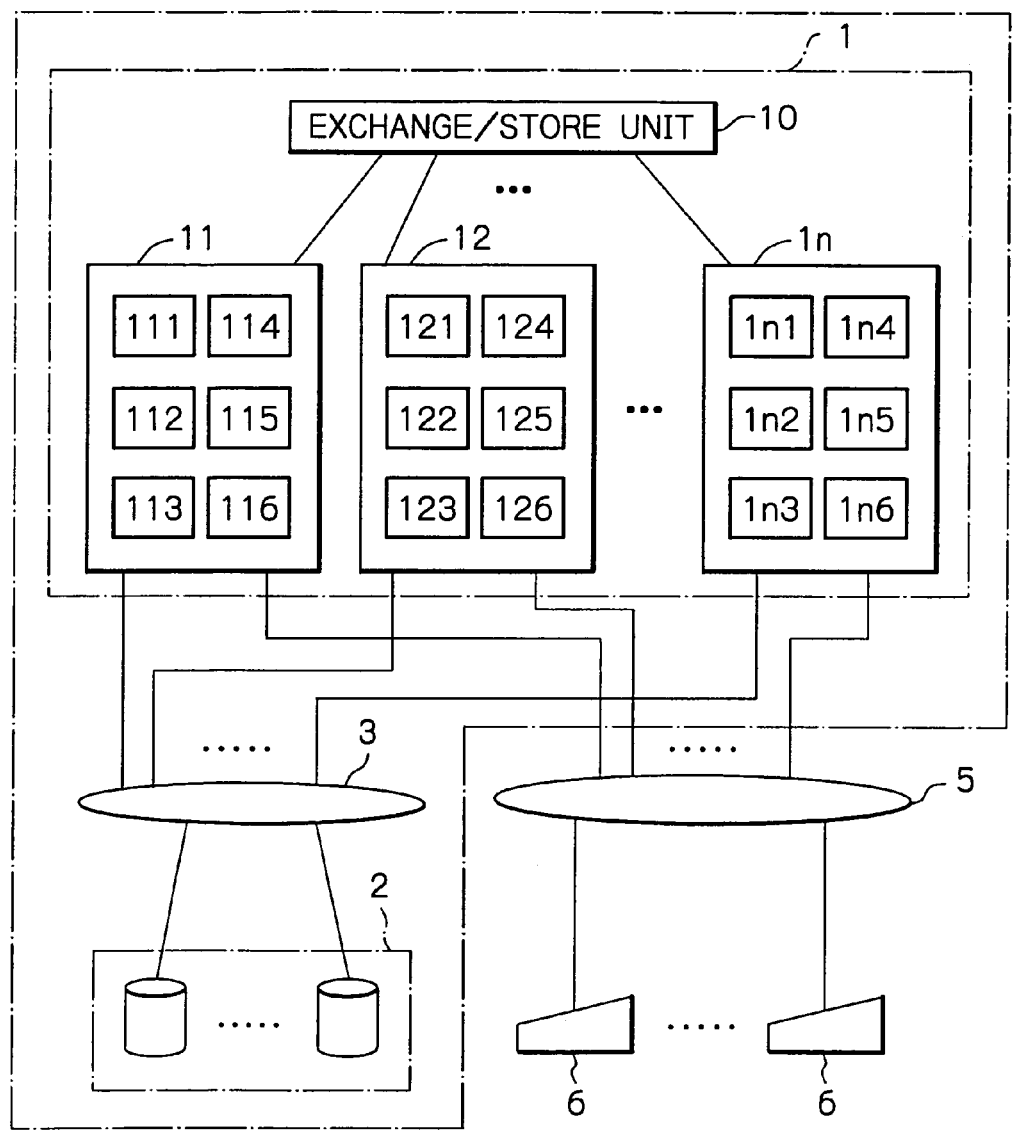
FIG. 10 is a block circuit diagram illustrating a second embodiment of the load-distributed computer system according to the present invention.

In FIG. 10, which illustrates a second embodiment of the load-distributed computer system according to the present invention, the relay distributing unit 4 of FIG. 1 is not provided. Instead of this, one load data storing unit 1i4, one load data measuring unit 1i5 and one executing-computer selecting unit 1i6 corresponding to the load data storing unit 41, the load data measuring unit 42 and the executing-computer selecting unit 43, respectively, of FIG. 1 are provided, and an exchange/store unit 10 is connected to the computer 11, 12, . . . , 1n. Note that the hardware of the computer 1i is also illustrated in FIG. 2.

In the computer system of FIG. 10, in each of the computers 1i, at predetermined time periods, the load data measuring unit 1i1 measures a load data. Then, the load data measuring unit 1i5 changes the load data into an estimated load data and stores it in the load data storing unit 1i1. Simultaneously, the estimated load data is transmitted via the exchange/store unit 10 to the load data storing units of all the other computers. Similarly, start and end of processing of each transaction in one computer are transmitted to the other computers. Thus, the latest estimated load data of all the computers are stored in all the computers.

Also, in the computer system of FIG. 10, a transaction (job) is processed as follows. First, a message requesting a transaction process is transmitted from one of the terminal units 6 via the communication network 5 to a predetermined computer such as 1i. Then, the load data measuring unit 1i5 calculates an estimated expansion ratio of the subject computer 1i. Then, the executing-computer selecting unit 1i6 determines whether the subject computer 1i carries out this message or the subject computer 1i sends this message via the exchange/store unit 10 to another computer, in accordance with the estimated expansion ratio of the subject computer 1i. When the subject computer 1i is determined to carry out the message, the transaction processing unit 1i2 of the subject computer 1i carries out the transaction process. On the other hand, when the other computer is determined to carry out the message, the transaction processing unit thereof carries out the transaction process. After the transaction process is completed, a response message is transferred from the subject computer or the other computer via the exchange/store unit 10 to all the other computers.

Figure 11A:
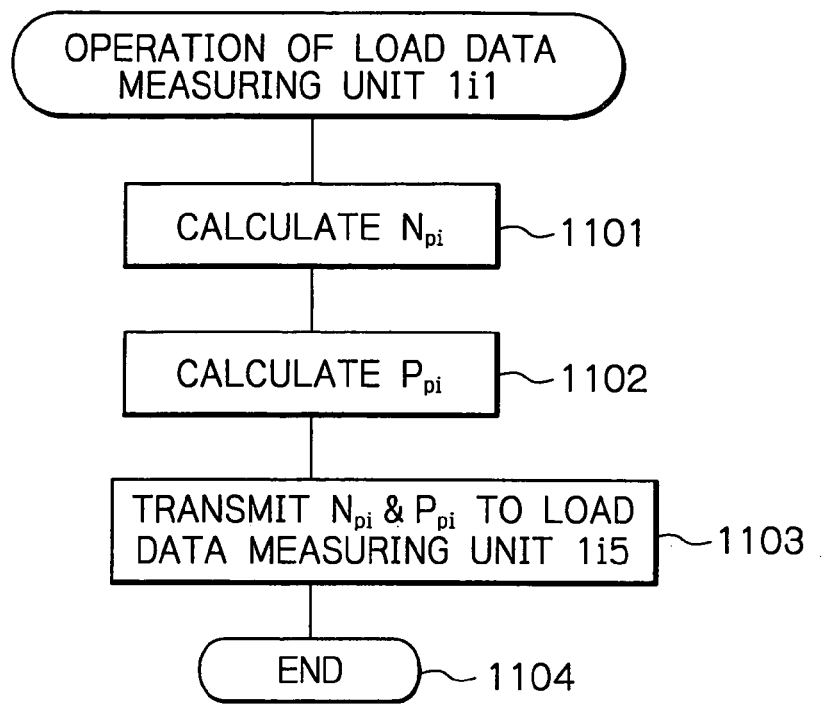
FIG. 11A is a flowchart for explaining the operation of the load data measuring unit 1*i*1 of the computer of FIG. 10.
Figure 11B:
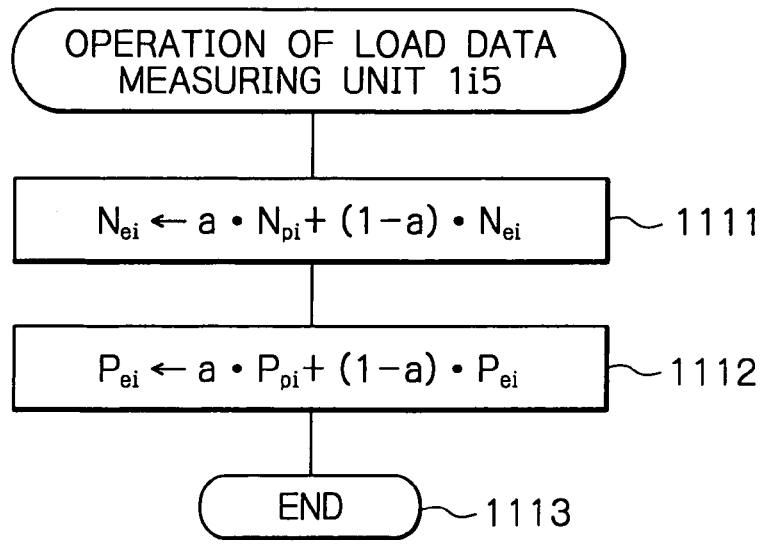
FIG. 11B is a flowchart for explaining the operation of the load data measuring unit 1*i*5 of the relay distributing of FIG. 10.

The operations of the load data measuring unit 1i1 and the load data measuring unit 1i5 are explained next with reference to flowcharts as illustrated in FIGS. 11A and 11B.

The flowchart as illustrated in FIG. 11A is carried out by the load data measuring unit 1i1 at predetermined time periods.

First, at step 1101, the load data measuring unit 1i1 calculates the number $N_{pi}$ of transactions in total which are currently assigned to the computer 1i.

Next, at step 1102, the load data measuring unit 1i1 calculates the number $P_{pi}$ of transactions which are currently being executed in the computer 1i.

Next, at step 1103, the load data measuring unit 1i1 transmits the current load data the $N_{pi}$ and $P_{pi}$ to the load measuring unit 1i5.

Thus, the operation of the flowchart of FIG. 11A is completed by step 1104.

The flowchart of FIG. 11B is carried out by the load data measuring unit 1i5 every time the load data measuring unit 1i5 receives the current load data $N_{pi}$ and $P_{pi}$ from the load data measuring unit 1i1.

First, at step 1111, the load data measuring unit 1i5 calculates an estimated number $N_{ei}$ by $$N_{ei} \leftarrow a \cdot N_{pi} + (1-a) \cdot N_{ei}$$

where "a" is a definite value ($0 < a \leq 1$). Then, the estimated number $N_{ei}$ is stored in the load data storing unit 1i4. Simultaneously, the estimated number $N_{ei}$ is transmitted via the exchange/store unit 10 to the other computers and is stored in the load data storing units thereof.

Next, at step 1112, the load data measuring unit 1i5 calculates an estimated number $P_{ei}$ by $$P_{ei} \leftarrow a \cdot P_{pi} + (1-a) \cdot P_{ei}$$

Then, the estimated number $P_{ei}$ is stored in the load data storing unit i4. Simultaneously, the estimated number $P_{ei}$ is transmitted via the exchange/store unit 10 to the other computer and is stored in the load data storing units thereof.

Thus, the flowchart of FIG. 11B is completed by step 1113.

In FIG. 11B, the estimated load data $N_{ei}$ and $P_{ei}$ are the same as those of FIG. 3B.

Figure 12:
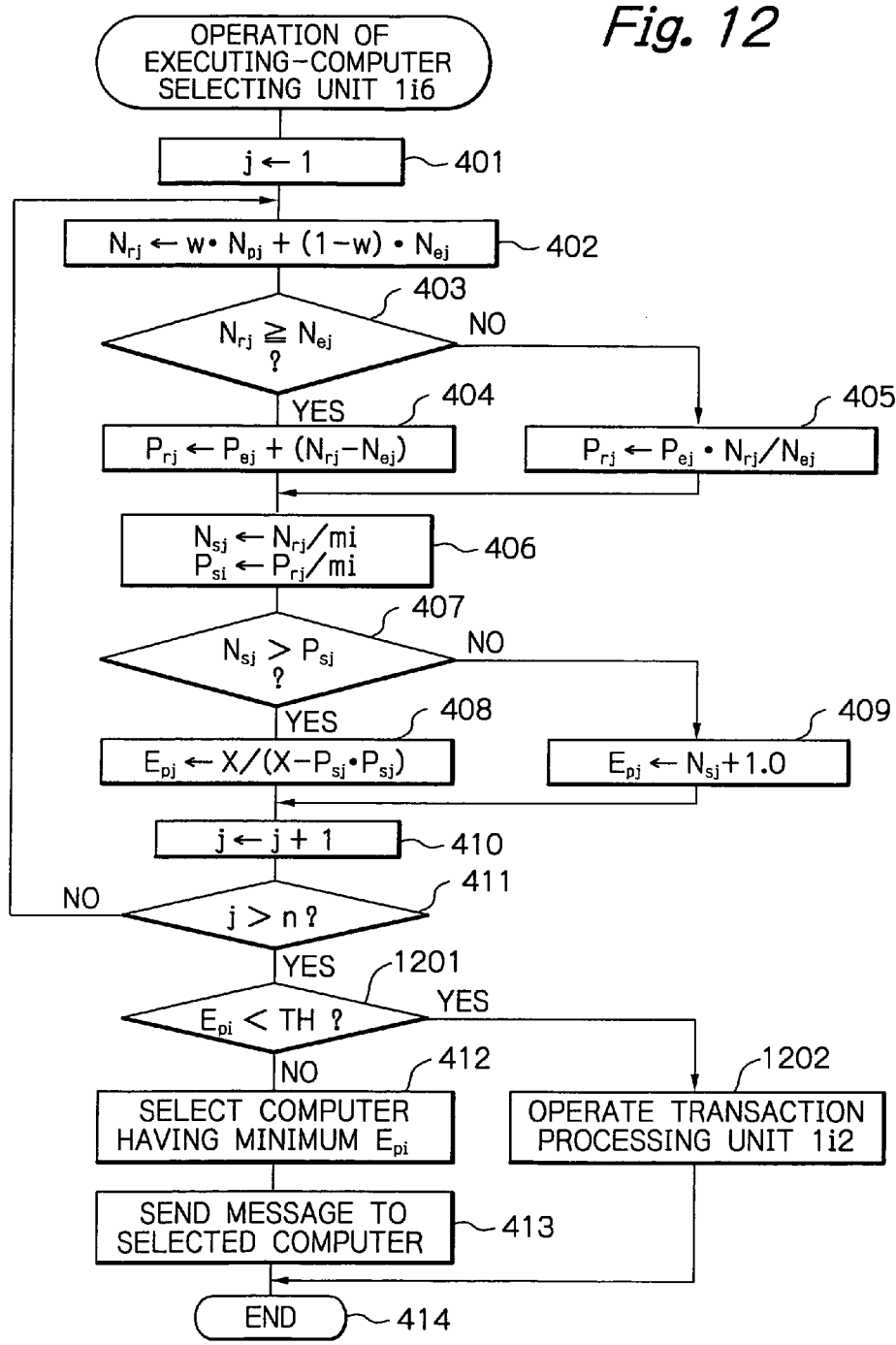
FIG. 12 is a flowchart for explaining the operation of the executing-computer selecting unit of FIG. 10.

The operation of the executing-computer selecting unit 1i6 is explained next with reference to a flowchart as illustrated in FIG. 12, which is carried out every time one of the terminal units 6 transmits a message requesting a transaction process via the communication network 5 and the communication unit 1i3 to the executing-computer selecting unit 1i6.

In FIG. 12, steps 1201 and 1202 are added to the steps of FIG. 4.

That is, after all the estimated expansion ratios $E_{p1}$, $E_{p2}$, . . . , $E_{pn}$ are calculated, at step 1201, it is determined whether or not the estimated expansion ratio $E_{pi}$ of the subject computer 1i is smaller than a threshold value TH such as 1.3. As a result, only when $E_{pi} < TH$, does the control proceed to step 1202 which operates the transaction processing unit 1i2 of the subject computer 1i, so that the transaction process is carried out in the computer 1i. Otherwise, i.e., if $E_{pi} \geq TH$, the control proceeds to steps 412 and 413.

At step 412, the executing-computer selecting unit 1i6 selects one of the computers having the minimum estimated expansion ratio $E_{pi}$.

Then, at step 413, the executing-computer selecting unit 43 sends a message requesting a transaction process to the computer selected at step 412.

After the transaction processing unit of any computer completes the transaction process, this transaction processing unit sends a response message via the exchange store unit 10 to the other computers.

Note that, at step 412, if the computer 1i, is determined to have the minimum estimated expansion ratio in spite of the estimated expansion ratio $E_{pi}$ being large ($E_{pi} \geq TH$), the computer 1i is selected after all.

In FIG. 12, at step 1201, the threshold value TH is a definite value such as 1.3; however, the threshold value TH can be dependent upon the minimum estimated expansion ratio $E_{pmin}$. For example, $TH = 1.3 \cdot E_{pmin}$. In this case, at step 1201, the minimum estimated expansion ratio $E_{pmin}$ is calculated in advance.

Even in the second embodiment, any of the other load indexes $L_{p2}$, $L_{a1}$, $L_{a2}$, $L_{a3}$, $L_{k1}$, $L_{k2}$ and $L_{k3}$ of FIG. 6 can be used instead of the load index $L_{p1}(=E_{pi})$. For example, if the load index $L_{a3}$ or $L_{k3}$ is used, the threshold value TH is a smaller value such as 0.02.

Further, in FIG. 12, at step 1201, the threshold value TH is dependent upon the predetermined time period of carrying out the flowcharts as illustrated in FIGS. 11A and 11B. In this case, the longer this time period, the larger the threshold value TH. This is because the increased predetermined time period deteriorates the reliability of the load index.

In FIG. 10, if the exchange/store unit 10 has a high speed storage, the function of the load data storing units 114, 124, ..., 1i4, ..., 1n4 of all the computers can be moved to the exchange/store unit 10, which would decrease the overhead by renewing the load data. Also, a message requesting a transaction process can be temporarily stored in the exchange/store unit 10, and in this case, the computers can access the messages stored in the exchange/store unit 10 asynchronously.

Thus, in the second embodiment, since the relay distributing unit 4 of FIG. 1 is not provided, the manufacturing cost can be decreased as compared with the first embodiment. Although the load distribution is not centralized, when a subject computer receives a message requesting a transaction process, the subject computer calculates an estimated extension ratio and determines one of the computers to execute the transaction process, thus decreasing the overhead and realizing a high response characteristic.

Figure 13:
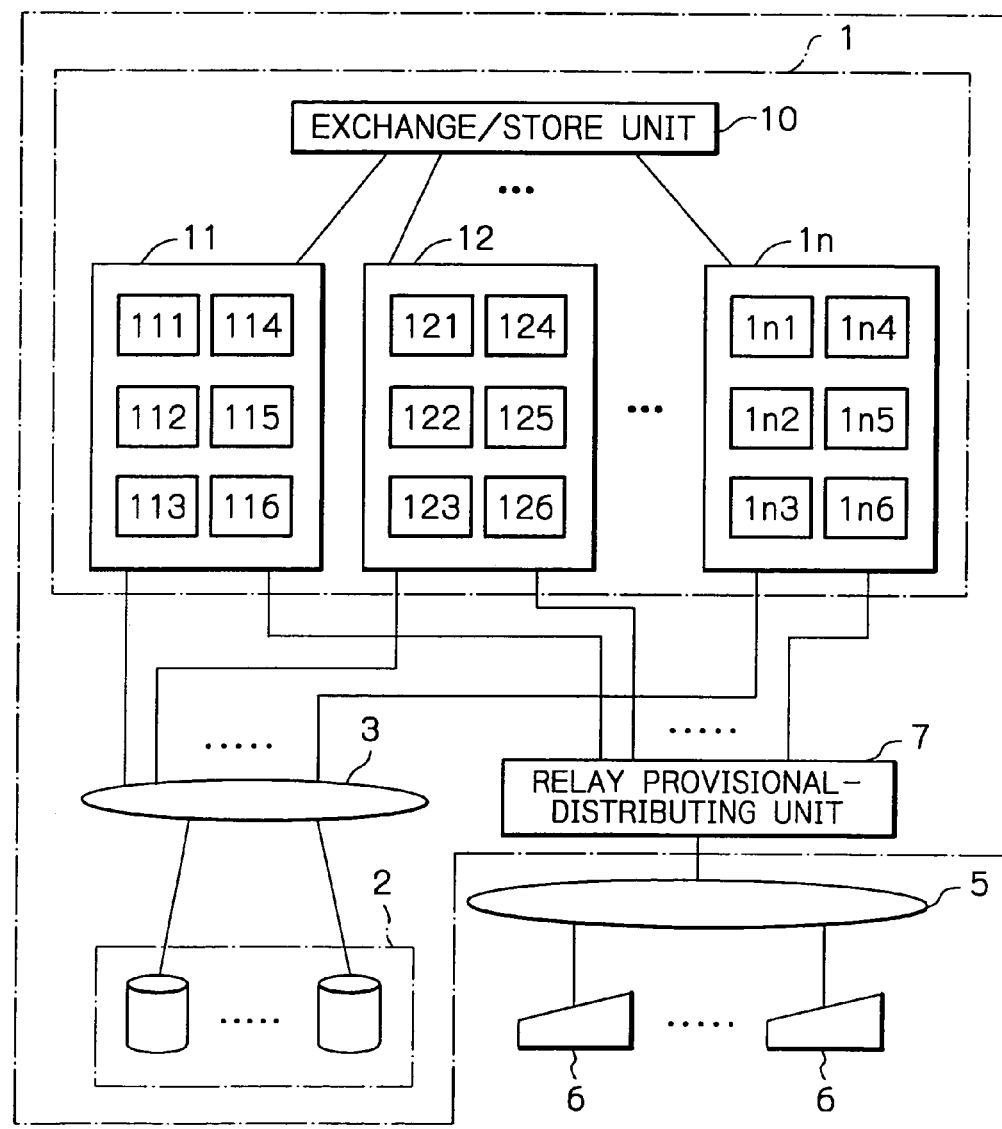
FIG. 13 is a block circuit diagram illustrating a third embodiment of the load-distributed computer system according to the present invention.

In FIG. 13, which illustrates a third embodiment of the load-distributed computer system according to the present invention, a relay provisional-distributing unit 7 is provided between the computers 11, 12, ..., 1n and the communication network, 5 of FIG. 10, in order to distribute a message requesting a transaction process among the computer 11, 12, ..., in statically or quasi-statically in accordance with the following methods in combination or individually.

1) distribution by dividing the terminal units 6 into a plurality of groups each corresponding to one of the computers 11, 12, ..., 1n;

2) distribution by sequentially messages arrived at the relay provisional-distributing unit 7 to the computers 11, 12, ..., 1n in accordance with the numbers of CPUs therein; and 3) stochastic distribution in accordance with result data.

In the distribution 1), each of the terminal units 6 is allocated in advance to one of the computers 11, 12, ..., 1n. In the second embodiment, the distribution may be adopted; however, the allocation of the terminal units 6 to the computer 11, 12, ..., 1n is fixed. On the other hand, in the third embodiment, the allocation of the terminal units 6 to the computers 11, 12, ..., 1n can be changed by the relay provisional-distributing unit 7, to realize an optimum allocation.

In the distribution 2), if a sequence of m1, m2, ..., mn messages arrive at the relay provisional-distributing unit 7, the first m1 messages to arrive at the relay provisional-distributing unit 7 are allocated to the computer 11, the second m2 messages arrived at the relay provisional-distributing unit 7 are allocated to the computer 12, ..., the final mn messages to arrive at the relay provisional-distributing unit 7 are allocated to the computer 1n. Particularly, when the job characteristics of a large number of transactions belong to the same class, the balancing effect of the load can be optimized.

In the distribution 3), the ratio of messages allocated to the computer 1i is determined in accordance with the load thereof periodically such as at every 1 sec or 10 sec.

The operation of the computer system of FIG. 13 is substantially the same as that of the computer system of FIG. 10. Only if the distribution 3) is adopted, does the relay provisional-distributing unit 7 receive the load states of the computers 11, 12, ..., 1n periodically.

Thus, in the third embodiment, since the relay provisional-distributing unit 7 has a limited function, the manufacturing cost can be also decreased as compared with the first embodiment. Also, since the relay provisional-distributing unit 7 carries out a provisional load-distribution to realize a quasi-static load-distribution, the improvement of the response performance such as the average and deviation characteristics of the response time can be expected. Additionally, since a balancing load-distribution is provisionally realized at the relay provisional-distributing unit 7, the fluctuation of unbalancing of load-distribution between the computers 11, 12, ..., 1n can be suppressed, which would decrease the transfer of messages from one computer to another.

Figure 14:
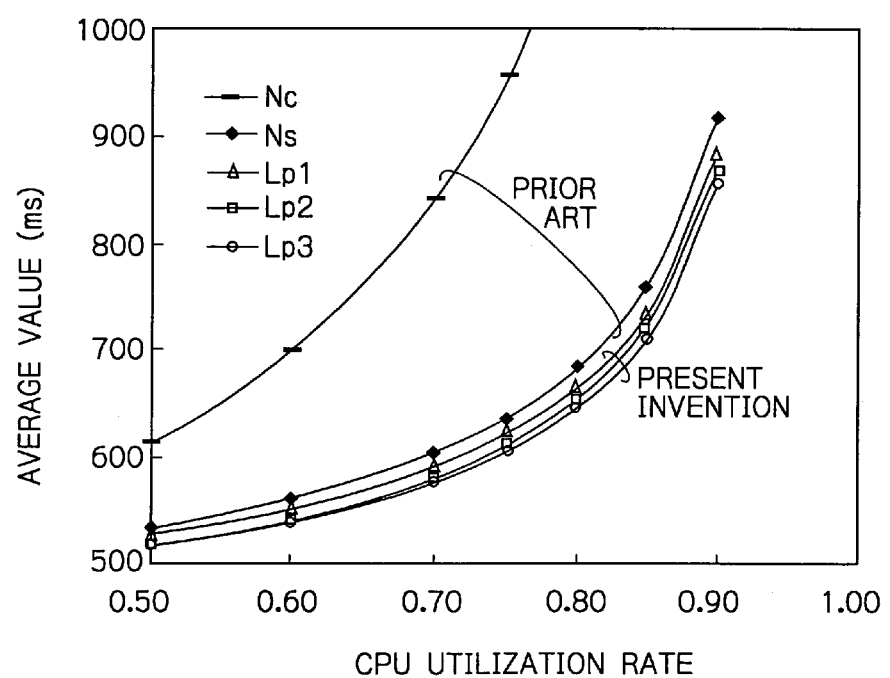
FIGS. 14 and 15 are graphs showing the effect of the present invention as compared with the prior art.
Figure 15:
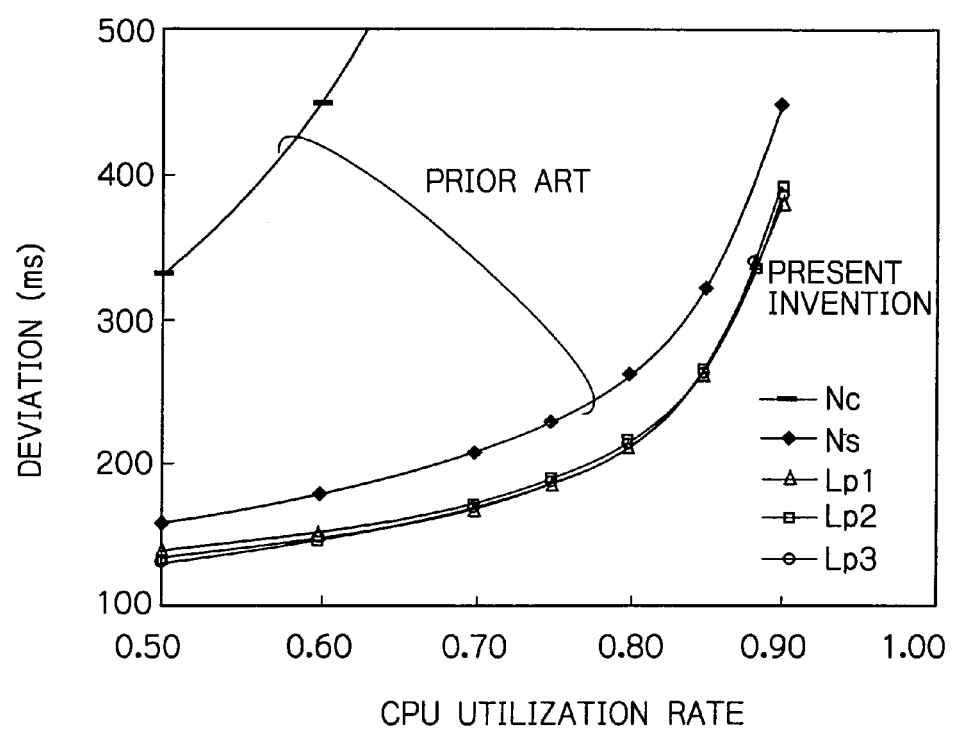

The effect of the present invention as compared with the prior art is explained next with reference to FIGS. 14 and 15 which show the average and deviation characteristics, respectively, of the response time. In FIGS. 14 and 15, a computer system is assumed to have eight computers whose CPU numbers are 4, 1, 1, 1, 1, 1, 2 and 2, and messages are assumed to be randomly generated. Also, $N_c$ designates a no load-distribution state; $N_c$ designates a dynamic load-distribution state using $N_c/m$ as a load index where $N_c$ is the number of transactions currently being executed and m is the number of CPUs; and $L_{p1}$, $L_{a2}$ and $L_{k3}$ designate load-distribution state using the load indexes $L_{p1}$, $L_{a2}$ and $L_{k3}$ according to the present invention. As shown in FIGS. 14 and 15, the average and deviation characteristics of the load-distribution according to the present invention are both improved as compared with the prior art.

As explained hereinabove, according to the present invention, the response performance characteristics such as the average and deviation characteristics of the response time can be improved.

The invention claimed is:

1. A method for distributing a transaction in a computer system including a plurality of computers each formed by processors, comprising the steps of:

calculating a plurality of estimated loads one for each of said computers;

calculating a plurality of estimated process time expansion ratios one for each of said computers, in accordance with said estimated loads and the numbers of processors in said computers;

calculating a plurality of load indexes, one for each of said computers, in accordance with said estimated process time expansion ratios; and distributing said transaction in accordance with said load indexes wherein said estimated load calculating step further includes:

calculating a plurality of current loads one for each of said computers at predetermined time periods; and calculating said estimated loads by $$L_e \leftarrow a \cdot L_p + (1-a) \cdot L_e$$

where $L_e$ is an estimated load, $L_p$ is a current load, and

"a" is a definite value ($0 < a \leq 1$)

wherein said load index calculating step calculates said load indexes each being a load index per processor in one of said computers after distributing said transaction to said computers.

2. The method as set forth in claim 1, wherein said estimated load calculating step calculates said estimated loads at predetermined time periods.

3. The method as set forth in claim 1, wherein each of said estimated loads comprises a first estimated load relating to the number of transactions currently assigned to one of said computers and a second estimated load relating to the number of transactions currently being executed in the processors of said one of said computers.

4. The method as set forth in claim 1, wherein said estimated process time expansion ratio calculating step comprises a step of correcting each of said estimated loads by the number of transactions currently assigned to said computers to obtain corrected estimated loads, so that said estimated process time expansion ratios are calculated in accordance with said corrected estimated loads and the numbers of processors in said computers.

5. The method as set forth in claim 1, wherein said load indexes are said estimated process time expansion ratios.

6. The method as set forth in claim 1, wherein said load indexes are said estimated process time expansion ratios per processor in said computers.

7. The method as set forth in claim 1, wherein said load index calculating step calculates said load indexes after distributing said transaction to said computers.

8. The method as set forth in claim 1, wherein said load index calculating step comprises the steps of:
  calculating a first load index per processor in one of said computers before distributing said transaction to said computers;
  calculating a second load index per processor in one of said computers after distributing said transaction to said computers; and
  calculating a difference between said second and first load indexes as one of said load indexes.

9. The method as set forth in claim 1, wherein said transaction distributing step comprises the steps of:
  selecting one of said computers having the minimum load index; and
  causing said transaction to be processed by said one of said computers.

10. The method as set forth in claim 1, wherein said transaction distributing step comprises the steps of:
  determining whether or not one of said load indexes is smaller than a threshold value; and
  causing said transaction to be processed by one of said computers having said one of said load indexes, when said one of said load indexes is smaller than said threshold value.

11. The method as set forth in claim 10, wherein said threshold value is dependent upon the minimum one of said load indexes.

12. A method for distributing a transaction in a computer system including a plurality of computers each formed by processors, comprising the steps of:
  calculating a plurality of estimated loads one for each of said computers;
  calculating a plurality of estimated process time expansion ratios one for each of said computers, in accordance with said estimated loads and the numbers of processors in said computers;
  calculating a plurality of load indexes, one for each of said computers, in accordance with said estimated process time expansion ratios; and
  distributing said transaction in accordance with said load indexes
  wherein said estimated load calculating step further includes:
  calculating a plurality of current loads one for each of said computers at predetermined time periods; and
  calculating said estimated loads by $$L_e \leftarrow a \cdot L_p + (1-a) \cdot L_e$$

where $L_e$ is an estimated load,
  $L_p$ is a current load, and
  "a" is a definite value ($0 < a \leq 1$)
  wherein said load index calculating step calculates said load indexes each being a load index per processor in one of said computers before distributing said transaction to said computers.

13. The method as set forth in claim 12, wherein said estimated load calculating step calculates said estimated loads at predetermined time periods.

14. The method as set forth in claim 12, wherein each of said estimated loads comprises a first estimated load relating to the number of transactions currently assigned to one of said computers and a second estimated load relating to the number of transactions currently being executed in the processors of said one of said computers.

15. The method as set forth in claim 12, wherein said estimated process time expansion ratio calculating step comprises a step of correcting each of said estimated loads by the number of transactions currently assigned to said computers to obtain corrected estimated loads, so that said estimated process time expansion ratios are calculated in accordance with said corrected estimated loads and the numbers of processors in said computers.

16. The method as set forth in claim 12, wherein said load indexes are said estimated process time expansion ratios.

17. The method as set forth in claim 12, wherein said load indexes are said estimated process time expansion ratios per processor in said computers.

18. The method as set forth in claim 12, wherein said load index calculating step calculates said load indexes after distributing said transaction to said computers.

19. The method as set forth in claim 12, wherein said load index calculating step comprises the steps of:
  calculating a first load index per processor in one of said computers before distributing said transaction to said computers;
  calculating a second load index per processor in one of said computers after distributing said transaction to said computers; and
  calculating a difference between said second and first load indexes as one of said load indexes.

20. The method as set forth in claim 12, wherein said transaction distributing step comprises the steps of:
  selecting one of said computers having the minimum load index; and
  causing said transaction to be processed by said one of said computers.

21. The method as set forth in claim 12, wherein said transaction distributing step comprises the steps of:
  determining whether or not one of said load indexes is smaller than a threshold value; and
  causing said transaction to be processed by one of said computers having said one of said load indexes, when said one of said load indexes is smaller than said threshold value.

22. A load-distributed computer system comprising:
  a plurality of computers each including processors;
  a relay distributing unit for receiving a message for requesting a transaction process; and
  a channel communication network connected between said computers and said relay distributing unit,
  each of said computers comprising:
  a first load data measuring unit for measuring a load of said each of said computers:
  a transaction processing unit for processing transactions, said relay distributing unit comprising:
  a second load data measuring unit for receiving said load to calculate an estimated load in accordance with said load;

a load data storing unit for storing said estimated load data;

an executing computer selecting unit for calculating a plurality of estimated process time expansion ratios one for each of said computers, in accordance with said stored estimated load and the number of processors in each of said computers, calculating a plurality of load indexes, one for each of said computers, in accordance with said estimated process time expansion ratios, selecting one of said computers having the minimum load index in accordance with said load indexes, and causing said transaction process to be processed by said transaction processing unit of said selected computer wherein said second load data measuring unit comprises:

a section adapted to calculate a plurality of current loads one for each of said computers at predetermined time periods; and a section adapted to calculate said estimated loads by $$L_e \leftarrow a \cdot L_p + (1-a) \cdot L_e$$

where $L_e$ is an estimated load,
$L_p$ is a current load, and
"a" is a definite value ($0 < a \leq 1$).

23. The system as set forth in claim 22, wherein said second load data measuring unit calculates said estimated loads at predetermined time periods.

24. The system as set forth in claim 22, wherein each of said estimated loads comprises a first estimated load relating to the number of transactions currently assigned to one of said computers and a second estimated load relating to the number of transactions currently being executed in the processors of said one of said computers.

25. The system as set forth in claim 22, wherein said executing computer selecting unit comprises a section adapted to correct each of said estimated loads by the number of transactions currently assigned to said computers to obtain corrected estimated loads, so that said estimated process time expansion ratios are calculated in accordance with said corrected estimated loads and the numbers of processors in said computers.

26. The system as set forth in claim 22, wherein said load indexes are said estimated process time expansion ratios.

27. The system as set forth in claim 22, wherein said load indexes are said estimated process time expansion ratios per processor in said computers.

28. The system as set forth in claim 22, wherein said executing computer selecting unit calculates said load indexes after distributing said transaction to said computers.

29. The system as set forth in claim 22, wherein said executing computer selecting unit calculates said load indexes each being a load index per processor in one of said computers after distributing said transaction to said computers.

30. The system as set forth in claim 22, wherein said executing computer selecting unit calculates said load indexes each being a load index per processor in one of said computers before distributing said transaction to said computers.

31. The system as set forth in claim 22, wherein said executing computer selecting unit comprises:

a section adapted to calculate a first load index per processor in one of said computers before distributing said transaction to said computers;

a section adapted to calculate a second load index per processor in one of said computers after distributing said transaction to said computers; and a section adapted to calculate a difference between said second and first load indexes as one of said load indexes.

32. The system as set forth in claim 22, wherein said executing computer selecting unit comprises:

a section adapted to select one of said computers having the minimum load index; and a section adapted to cause said transaction to be processed by said transaction processing unit of said one of said computers.

33. A load-distributed computer system comprising:

a plurality of computers each including processors each for receiving a message for requesting a transaction process; and an exchange/store unit connected to said computers, each of said computers comprising:

a first load data measuring unit for measuring a load of said each of said computers;

a transaction processing unit for processing transactions, a second load data measuring unit for receiving said load to calculate an estimated load in accordance with said load;

a load data storing unit for storing said estimated load data;

an executing computer selecting unit for calculating a plurality of estimated process time expansion ratios one for each of said computers, in accordance with said stored estimated load and the number of processors in each of said computers, calculating a plurality of load indexes, one for each of said computers, in accordance with said estimated process time expansion ratios, determining whether or not said each of said computers is to process said transaction process in accordance with said load indexes, causing said transaction process to be processed by said transaction processing unit when said each of said computers is to process said transaction process, and transmitting said message via said exchange/store unit to another computer when said each of said computer is not to process said transaction process wherein said second load data measuring unit comprises:

means for a section calculating a plurality of current loads one for each of said computers at predetermined time periods; and means for calculating said estimated loads by $$L_e \leftarrow a \cdot L_p + (1-a) \cdot L_e$$

where $L_e$ is an estimated load,
$L_p$ is a current load, and
"a" is a definite value ($0 < a \leq 1$).

34. The system as set forth in claim 33, wherein said second load data measuring unit calculates said estimated loads at predetermined time periods.

35. The system as set forth in claim 33, wherein each of said estimated loads comprises a first estimated load relating to the number of transactions currently assigned to one of said computers and a second estimated load relating to the number of transactions currently being executed in the processors of said one of said computers.

36. The system as set forth in claim 33, wherein said executing computer selecting unit comprises means for correcting each of said estimated loads by the number of transactions currently assigned to said computers to obtain corrected estimated loads, so that said estimated process time expansion ratios are calculated in accordance with said corrected estimated loads and the numbers of processors in said computers.

37. The system as set forth in claim 33, wherein said load indexes are said estimated process time expansion ratios.

38. The system as set forth in claim 33, wherein said load indexes are said estimated process time expansion ratios per processor in said computers.

39. The system as set forth in claim 33, wherein said executing computer selecting unit calculates said load indexes after distributing said transaction to said computers.

40. The system as set forth in claim 33, wherein said executing computer selecting unit calculates said load indexes each being a load index per processor in one of said computers after distributing said transaction to said computers.

41. The system as set forth in claim 33, wherein said executing computer selecting unit calculates said load indexes each being a load index per processor in one of said computers before distributing said transaction to said computers.

42. The system as set forth in claim 33, wherein said executing computer selecting unit comprises:
- a section adapted to calculate a first load index per processor in one of said computers before distributing said transaction to said computers;
- a section adapted to calculate a second load index per processor in one of said computers after distributing said transaction to said computers; and
- a section adapted to calculate a difference between said second and first load indexes as one of said load indexes.

43. The system as set forth in claim 33, wherein said executing computer selecting unit comprises a section adapted to determining whether or not one of said load indexes is smaller than a threshold value, thus determining whether or not said each of said computers is to process said transaction process.

44. The system as set forth in claim 43, wherein said threshold value is dependent upon the minimum one of said load indexes.

45. The system as set forth in claim 33, further comprising a relay provisional-distributing unit, connected to said computers, for statically or quasi-statically distributing said message to said computers.

46. The system as set forth in claim 45, wherein said relay provisional-distributing unit distributes said message to said computers by dividing a plurality of terminal units connected to said relay provisional-distributing unit into a plurality of groups each corresponding to one of said computers.

47. The system as set forth in claim 45, wherein said relay provisional-distributing unit distributes said message to said computers by sequentially said message to said computers in accordance with the numbers of processors therein.

48. The system as set forth in claim 45, wherein said relay provisional-distributing unit stochastically distributes said message to said computers.

* * * * *